(12) United States Patent
Wang et al.

(10) Patent No.: US 11,951,398 B2
(45) Date of Patent: *Apr. 9, 2024

(54) METHOD AND APPARATUS FOR CONTROLLING VIRTUAL RACE CAR, STORAGE MEDIUM, AND DEVICE

(71) Applicant: Tencent Technology (Shenzhen) Company Limited, Shenzhen (CN)

(72) Inventors: Meng Wang, Shenzhen (CN); Rui Zheng, Shenzhen (CN); Haosheng Xue, Shenzhen (CN); Lei Zheng, Shenzhen (CN)

(73) Assignee: TENCENT TECHNOLOGY (SHENZHEN) COMPANY LIMITED, Shenzhen (CN)

( * ) Notice: Subject to any disclaimer, the term of this patent is extended or adjusted under 35 U.S.C. 154(b) by 0 days.

This patent is subject to a terminal disclaimer.

(21) Appl. No.: 17/988,711

(22) Filed: Nov. 16, 2022

(65) Prior Publication Data
US 2023/0084808 A1 Mar. 16, 2023

Related U.S. Application Data

(63) Continuation of application No. 17/341,207, filed on Jun. 7, 2021, now Pat. No. 11,529,560, which is a
(Continued)

(30) Foreign Application Priority Data
Apr. 30, 2019 (CN) .......................... 201910363803.6

(51) Int. Cl.
*A63F 13/65* (2014.01)
*A63F 13/5378* (2014.01)
(Continued)

(52) U.S. Cl.
CPC .......... *A63F 13/65* (2014.09); *A63F 13/5378* (2014.09); *A63F 13/577* (2014.09);
(Continued)

(58) Field of Classification Search
CPC .... A63F 13/65; A63F 13/5378; A63F 13/577; A63F 13/58; A63F 13/52
See application file for complete search history.

(56) References Cited

U.S. PATENT DOCUMENTS 6,676,524 B1 1/2004 Botzas
8,157,653 B2 4/2012 Buhr
(Continued)

FOREIGN PATENT DOCUMENTS

CN 106861186 A 6/2017
CN 107376351 A 11/2017
(Continued)

OTHER PUBLICATIONS

TV Tropes, "Video Game / Bumper Wars", Bumper Wars video game, published by Simon & Schusters, as evidenced by TV Trope game summary, 7 pgs., Retrieved from the Internet: https://tvtropes.org/pmwiki/pmwiki.php/VideoGame/BumperWars.
(Continued)

*Primary Examiner* — James S. McClellan
(74) *Attorney, Agent, or Firm* — Morgan, Lewis & Bockius LLP

(57) ABSTRACT

This application discloses a method for controlling a virtual race car based on artificial intelligence (AI). The method includes: controlling, using a client, a first virtual race car to move on a virtual map of a round of racing game, the first virtual race car being a pursuing race car and the first account being an account participating in the round of racing game; displaying, on the client, that an endurance value of a second virtual race car is reduced when a predefined
(Continued)

location of the first virtual race car hits the second virtual race car on the virtual map, the second virtual race car being a fleeing race car in the round of racing game controlled by a second account logged into the round of racing game; and displaying, on the client, that the second virtual race car wins the round of racing game when the endurance value of the second virtual race car is greater than a preset threshold for a specified time.

20 Claims, 11 Drawing Sheets

Related U.S. Application Data continuation of application No. PCT/CN2020/082887, filed on Apr. 2, 2020.

(51) Int. Cl.
| | | |
|---|---|---|
| *A63F 13/577* | (2014.01) | |
| *A63F 13/58* | (2014.01) | |
| *A63F 13/79* | (2014.01) | |
| *A63F 13/803* | (2014.01) | |
| *A63F 13/92* | (2014.01) | |

(52) U.S. Cl.
CPC .............. *A63F 13/58* (2014.09); *A63F 13/79* (2014.09); *A63F 13/803* (2014.09); *A63F 13/92* (2014.09); *A63F 2300/638* (2013.01)

(56) References Cited

U.S. PATENT DOCUMENTS

| | | | |
|---|---|---|---|
| 11,529,560 B2 | 12/2022 | Wang et al. | |
| 2002/0132665 A1 | 9/2002 | Kato | |
| 2003/0008713 A1 | 1/2003 | Ushiro et al. | |
| 2003/0109296 A1* | 6/2003 | Leach .................... | A63F 13/52 463/6 |
| 2010/0292011 A1 | 11/2010 | Kira et al. | |
| 2021/0291057 A1 | 9/2021 | Wang et al. | |

FOREIGN PATENT DOCUMENTS

| | | |
|---|---|---|
| CN | 107744665 A | 3/2018 |
| CN | 108714304 A | 10/2018 |
| CN | 110124308 A | 8/2019 |
| JP | 2001276431 A | 10/2001 |
| JP | 2003340144 A | 12/2003 |

OTHER PUBLICATIONS

10min Gameplay, "Bumper Wars . . . (PC) [2001] Gameplay", YouTube.com, Bumper Wars video game, published by Simon & Schusters Interactive, Jun. 25, 2018, 3 pgs., Retrieved from the Internet: https://www.youtube.com/watch?v=WovvfGBA5so.

Fallen Angel Fighting Game Commentary, "This is Definitely the Best Operation of the 2018 King of Fighters 97!, (I watched it hundreds of times)", Dec. 17, 2018, Retrieved from the Internet: https://www.bilibili.com/video/av38363941?search&seid=5712934497200854252.

Kanzaki Holmes Aria, "Need for Speed, OL1V1 Ranking, 971 points GT3VS1062 points GTR, (Narrowly won)", Oct. 31, 2018, Retrieved from the Internet: https://www.bilibili.com/video/av35016526?from=search&seid=17839718917939392892.

Racing Racing RAC, "'Hurricane 5 Heaven' Event Introduction and Connection Introduction", Jun. 2, 2010, 3 pgs., Retrieved from the Internet: https://gl.ali213.net/html/2010/13844.html.

Tencent Technology, ISRWO, PCT/CN2020/082887, dated Jul. 3, 2020, 8 pgs.

Tencent Technology, IPRP, PCT/CN2020/082887, dated Nov. 2, 2021, 6 pgs.

Tencent Technology, JP Office Action, Japanese Patent Application No. 2021-537955, dated Sep. 27, 2022, 13 pgs.

Tmartn2, "Wreckfest—Part 2—Playing Multiplayer Online", YouTube, Aug. 30, 2018, 8 pgs., Retrieved from the Internet: https://www.youtube.com/watch?v=3eC68Pgf0Zg.

Jiuyou, "Crashing in 'National Drift Hotrace' is Also a Technical Job!", 9Game, Jul. 25, 2015, 4 pgs., Retrieved from the Internet: https://9game.cn/quanminpiaoyi/458293.html.

Soundhead Entertainment, "The Worst Wrecks Yet! | Wreckfest | NASCAR Legends Mod", YouTube, Feb. 1, 2019, 8 pgs., Retrieved from the Internet: https://www.youtube.com/watch?v=kpoP3h7da64.

Tencent Technology, Singapore Office Action, SG Patent Application No. 11202105530U, dated Jan. 30, 2023, 3 pgs.

"[Information] Destroy Quickly Rather Than Avoid! Need for Speed Edge Kingpin Clan Countermeasures", Apr. 20, 2018, 8 pgs., Retrieved from the Internet: https://www.inven.co.kr/webzine/news/?news=198022&site=nfs.

"Need for Speed: Rivals (r246 Edition)", Namu, 19 pgs., Retrieved from the Internet: https://namu.wiki/w/%EB%8B%88%EB%93%9C%20%ED%8F%AC%20%EC%8A%A4%ED%94%BC%EB%93%9C:%20%EB%9D%BC%EC%9D%B4%EB%B2%8C?rev=246.

Tencent Technology, Korean Office Action, KR Patent Application No. 10-2021-7023694, dated Sep. 7, 2023, 13 pgs.

"Wreckfest—Part 2—Playing Multiplayer Online", Aug. 30, 2018, 1 pg, Retrieved from the Interent: https://www.youtube.com/watch?v=3eC68Pgf0Zg&ab_channel-TmarTn2.

"[E3 2013] Impressions of 'Need for Speed Rivals' Where a Fierce Battle Between Racers and Police Unfolds", 4Gamer.net, Jun. 18, 2013, 13 pgs., Retrieved from the Internet: https://www.4gamer.net/games/217/G021754/20130618036/.

Momend Ltd., "Racer vs Police: Multiple Players", Appliv [online], Jul. 10, 2014, 3 pgs., Retrieved from the Internet: https://app-liv.jp/1653963/.

Tencent Technology, Japanese Office Action, JP Patent Application No. 2021-537955, dated Feb. 28, 2023, 11 pgs.

* cited by examiner

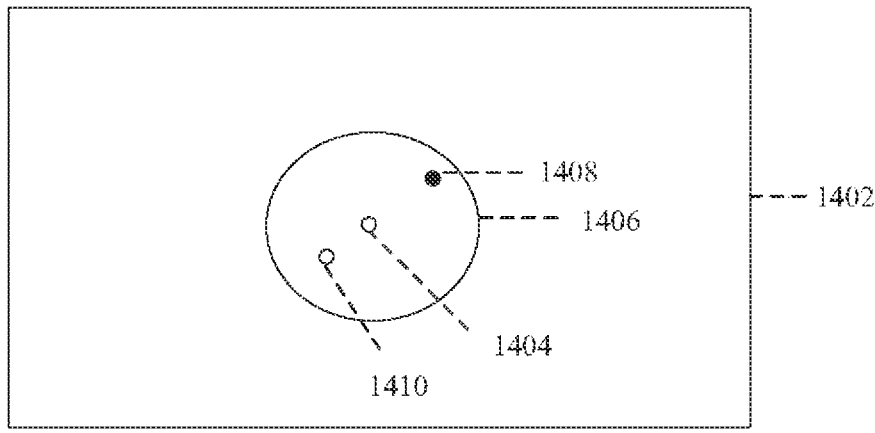

FIG. 14

| A client on which a second account is logged in controls a second virtual race car of the second account to move on a virtual map of a round of racing game | S1502 |

↓

| Display, on the client, that an endurance value of the second virtual race car is reduced when the second virtual race car is hit by a first virtual race car on the virtual map | S1504 |

↓

| Display, on the client, that the second virtual race car has been removed from the round of racing game when the endurance value of the second virtual race car is zero | S1506 |

FIG. 15

METHOD AND APPARATUS FOR CONTROLLING VIRTUAL RACE CAR, STORAGE MEDIUM, AND DEVICE

CROSS-REFERENCE TO RELATED APPLICATIONS

This application is a continuation application of U.S. patent application Ser. No. 17/341,207, entitled "METHOD AND APPARATUS FOR CONTROLLING VIRTUAL RACE CAR, STORAGE MEDIUM, AND DEVICE", filed on Jun. 7, 2021, which is a continuation application of PCT Patent Application No. PCT/CN2020/082887, entitled "VIRTUAL RACING CAR CONTROL METHOD AND APPARATUS, STORAGE MEDIUM AND DEVICE" filed on Apr. 2, 2020, which claims priority to Chinese Patent Application No. 201910363803.6, filed with the State Intellectual Property Office of the People's Republic of China on Apr. 30, 2019, and entitled "METHOD AND APPARATUS FOR CONTROLLING VIRTUAL RACE CAR, STORAGE MEDIUM, AND ELECTRONIC DEVICE", all of which are incorporated herein by reference in their entirety.

FIELD OF THE TECHNOLOGY

This application relates to the field of computers, and specifically, to a technology for controlling a virtual race car.

BACKGROUND OF THE DISCLOSURE

In the related art, a start line and a finish line are usually set in a process of a round of racing game on a terminal. Virtual race cars need to race from the start line to the finish line in the racing game before winners and losers can be determined. Alternatively, when a virtual race car of a user fails to reach the finish line, after virtual race cars of other users have reached the finish line, it still takes a period of time before winners and losers can be determined.

SUMMARY

Embodiments of this application provide a method and an apparatus for controlling a virtual race car, a storage medium, and a device, thereby improving the efficiency of ending a current round of virtual game by a second virtual race car.

According to an aspect of the embodiments of this application, a method for controlling a virtual race car is performed at a computer device, the method including: controlling, using a client on which a first account is logged in, a first virtual race car of the first account to move on a virtual map of a round of racing game, the first virtual race car being a pursuing race car in the round of racing game and the first account being an account participating in the round of racing game; displaying, on the client, that an endurance value of a second virtual race car is reduced when a predefined location of the first virtual race car hits the second virtual race car on the virtual map, the second virtual race car being a fleeing race car in the round of racing game controlled by a second account logged into the round of racing game; and displaying, on the client, that the second virtual race car wins the round of racing game when the endurance value of the second virtual race car is greater than a preset threshold for a specified time.

According to an aspect of the embodiments of this application, a method for controlling a virtual race car performed by a computer device is further provided, the method including: controlling, using a client on which a second account is logged in, a second virtual race car of the second account to move on a virtual map of a round of racing game, the second virtual race car being a fleeing race car in the round of racing game and the second account being an account participating in the round of racing game; displaying, on the client, that an endurance value of the second virtual race car is reduced when the second virtual race car is hit by a first virtual race car on the virtual map, the first virtual race car being a pursuing race car in the round of racing game; and displaying, on the client, that the second virtual race car has been removed from the round of racing game when the endurance value of the second virtual race car is no greater than a preset threshold.

According to an aspect of the embodiments of this application, an apparatus for controlling a virtual race car is further provided, including: a first control unit, configured to control a first virtual race car of the first account to move on a virtual map of a round of racing game, the first virtual race car being a pursuing race car in the round of racing game and the first account being an account participating in the round of racing game; a first display unit, configured to display, on the client, that an endurance value of a second virtual race car is reduced when a predefined location of the first virtual race car hits the second virtual race car on the virtual map, the second virtual race car being a fleeing race car in the round of racing game controlled by a second account logged into the round of racing game; and a second display unit, configured to display, on the client, that the second virtual race car wins the round of racing game when the endurance value of the second virtual race car is greater than a preset threshold for a specified time.

In one implementation, the second virtual race car is a virtual race car of a second account in the process of the round of racing game, and the second account is an account participating in the round of racing game.

In one implementation, the apparatus further includes: a first determining unit, configured to: determine that the first virtual race car hits the second virtual race car when the client controls the first virtual race car of the first account to move on the virtual map of the round of racing game and the second virtual race car is contacted in a first hit detection region in which the first virtual race car is located, a size of the first hit detection region being greater than a size of the first virtual race car, the first virtual race car being located in the first hit detection region, the first hit detection region moving as the first virtual race car moves; or a second determining unit, configured to determine that the first virtual race car hits the second virtual race car when the client controls the first virtual race car of the first account to move on the virtual map of the round of racing game and a second hit detection region in which the second virtual race car is located is contacted in a first hit detection region in which the first virtual race car is located, a size of the first hit detection region being greater than a size of the first virtual race car, the first virtual race car being located in the first hit detection region, the first hit detection region moving as the first virtual race car moves, a size of the second hit detection region being greater than a size of the second virtual race car, the second virtual race car being located in the second hit detection region, the second hit detection region moving as the second virtual race car moves.

In one implementation, the apparatus further includes: a third display unit, configured to display, on the client, that the endurance value of the second virtual race car is increased when the client controls the first virtual race car of the first account to move on the virtual map of the round of racing game and the second virtual race car remains within a preset region on the virtual map longer than a first preset duration.

In one implementation, the apparatus further includes: a fourth display unit, configured to display the preset region on the virtual map before the second virtual race car remains in the preset region on the virtual map longer than the first preset duration; and a fifth display unit, configured to cancel the display of the preset region on the virtual map when the second virtual race car remains in the preset region on the virtual map longer than the first preset duration.

In one implementation, the apparatus further includes: a second control unit, configured to cancel the display of the preset region on the virtual map when the round of racing game reaches a countdown start moment.

In one implementation, the apparatus further includes: a sixth display unit, configured to display, on the client, that the round of racing game has ended and the first virtual race car loses when the client controls the first virtual race car of the first account to move on the virtual map of the round of racing game, first preset duration after the round of racing game is started has ended, and there is a fleeing race car with an endurance value being greater than the preset threshold; or a seventh display unit, configured to display, on the client, that the round of racing game has ended and the first virtual race car wins when first preset duration after the round of racing game is started has ended and there is no fleeing race car with an endurance value being greater than the preset threshold.

In one implementation, the apparatus further includes: an eighth display unit, configured to: display, on the client, a first limit region set on the virtual map when the client controls the first virtual race car of the first account to move on the virtual map of the round of racing game; and perform any one or combination of the following manners: reducing any one or combination of the speed, acceleration, acceleration time, and endurance value of the second virtual race car when the second virtual race car enters the first limit region; and increasing any one or combination of the speed, acceleration, and acceleration time of the first virtual race car when the first virtual race car enters the first limit region.

In one implementation, the apparatus further includes: a third control unit, configured to cancel the display of the first limit region on the client after the first limit region on the virtual map is displayed on the client and the display of the first limit region reaches second preset duration, the setting of the first limit region being canceled on the virtual map; a ninth display unit, configured to: display, on the client, a second limit region set on the virtual map; and perform any one or combination of the following manners: reducing any one or combination of the speed, acceleration, acceleration time, and endurance value of the second virtual race car when the second virtual race car enters the second limit region; and increasing any one or combination of the speed, acceleration, and acceleration time of the first virtual race car when the first virtual race car enters the second limit region.

In one implementation, the apparatus further includes: a tenth display unit, configured to: display, on the client, a second limit region set on the virtual map after the first limit region on the virtual map is displayed on the client; and perform any one or combination of the following manners: reducing any one or combination of the speed, acceleration, acceleration time, and endurance value of the second virtual race car when the second virtual race car enters the second limit region; and increasing any one or combination of the speed, acceleration, and acceleration time of the first virtual race car when the first virtual race car enters the second limit region.

In one implementation, the first limit region and the second limit region are set in any one or combination of the following manners: the first limit region and the second limit region are regions randomly set on the virtual map; the first limit region is smaller than the second limit region; and the first limit region is contained in the second limit region, and the first limit region overlaps the second limit region.

In one implementation, the apparatus further includes: an eleventh display unit, configured to display a mini-map of the virtual map on the client when the client controls the first virtual race car of the first account to move on the virtual map of the round of racing game, the mini-map being used for displaying the positions of the first virtual race car and the second virtual race car on the virtual map.

In one implementation, the apparatus further includes: a fourth control unit, configured to display the mini-map on the client in a manner including any one or combination of the following: hiding the position of the second virtual race car on the mini-map displayed by the client when a distance between the second virtual race car and the first virtual race car is greater than a first threshold; a twelfth display unit, configured to display the position of the second virtual race car for third preset duration on the mini-map every fourth preset duration after the round of racing game is started; and a thirteenth display unit, configured to display the position of the second virtual race car on the mini-map displayed by the client when the round of racing game reaches the countdown start moment.

In one implementation, the apparatus further includes: a fourteenth display unit, configured to display, on the client, that a first initial position of the first virtual race car on the virtual map remains unchanged within fourth preset duration after the round of racing game is started as the round of racing game is started, it being set that the first virtual race car is not allowed within the fourth preset duration to start moving from the first initial position, it being set that the second virtual race car is allowed to start moving from a second initial position on the virtual map when the round of racing game is started.

In one implementation, the virtual map includes any one or combination of the following race tracks: a race track having both an underground structure and a ground structure; and a circular race track with a height difference.

According to an aspect of the embodiments of this application, an apparatus for controlling a virtual race car is further provided, including:

a control unit, configured to control, using a client on which a second account is logged in, a second virtual race car of the second account to move on a virtual map of a round of racing game, the second virtual race car being a fleeing race car in the round of racing game and the second account being an account participating in the round of racing game;

a first display unit, configured to display, on the client, that an endurance value of the second virtual race car is reduced when the second virtual race car is hit by a first virtual race car on the virtual map, the first virtual race car being a pursuing race car in the round of racing game; and a second display unit, configured to display, on the client, that the second virtual race car has been removed from the round of racing game when the endurance value of the second virtual race car is no greater than a preset threshold.

In one implementation, the first virtual race car is a virtual race car of a first account in the process of the round of racing game, and the first account is an account participating in the round of racing game.

In one implementation, the apparatus further includes: a third display unit, configured to display, on the client, that the endurance value of the second virtual race car is increased when the client controls the second virtual race car of the second account to move on the virtual map of the round of racing game and the second virtual race car remains within a preset region on the virtual map longer than a first preset duration.

In one implementation, the apparatus further includes: a fourth display unit, configured to: display, on the client, a first limit region set on the virtual map when the client controls the second virtual race car of the second account to move on the virtual map of the round of racing game; and perform any one or combination of the following manners: reducing any one or combination of the speed, acceleration, acceleration time, and endurance value of the second virtual race car when the second virtual race car enters the first limit region; and increasing any one or combination of the speed, acceleration, and acceleration time of the first virtual race car when the first virtual race car enters the first limit region.

According to an aspect of the embodiments of this application, a non-transitory computer-readable storage medium is further provided, storing a plurality of computer programs, the computer programs being configured to perform the foregoing method for controlling a virtual race car when executed by a processor of a terminal.

According to an aspect of the embodiments of this application, a terminal is further provided, including a memory, a processor, and a plurality of computer programs stored in the memory and executable on the processor. The processor performs the foregoing method for controlling a virtual race car through the computer programs.

According to an aspect of the embodiments of this application, a computer program product including instructions is further provided, the instructions, when run on a computer, causing the computer to perform the foregoing method.

In the embodiments of this application, the method including: controlling, by a client on which a first account is logged in, a first virtual race car of the first account to move on a virtual map of a round of racing game in a process in which the client runs the round of racing game; displaying, on the client, that an endurance value of a second virtual race car is reduced when the first virtual race car hits the second virtual race car on the virtual map; and displaying, on the client, that the second virtual race car has been removed from the round of racing game when the endurance value of the second virtual race car is no greater than a preset threshold. In the foregoing method, the endurance value of the second virtual race car is reduced when the first virtual race car hits the second virtual race car; and the second virtual race car ends the round of racing game when the endurance value of the second virtual race car is reduced to the preset threshold. The second virtual race car or the first virtual race car does not need to reach a preset finish line before the round of racing game can be ended, thereby improving the efficiency of ending a current round of virtual game by the second virtual race car.

BRIEF DESCRIPTION OF THE DRAWINGS

The accompanying drawings described herein are used for providing a further understanding of this application, and form part of this application. Exemplary embodiments of this application and descriptions thereof are used for explaining this application, and do not constitute any inappropriate limitation to this application. In the accompanying drawings:

FIG. 14 is a schematic diagram of an optional method for controlling a virtual race car according to an embodiment of this application.

FIG. 15 is a schematic flowchart of an optional method for controlling a virtual race car according to an embodiment of this application.

DESCRIPTION OF EMBODIMENTS

In order to make a person skilled in the art better understand the solutions of this application, the following clearly and completely describes the technical solutions in the embodiments of this application with reference to the accompanying drawings in the embodiments of this application. Apparently, the described embodiments are only some of the embodiments of this application rather than all of the embodiments. All other embodiments obtained by a person of ordinary skill in the art based on the embodiments of this application without creative efforts shall fall within the protection scope of this application.

In this specification, the claims, and the accompanying drawings of this application, the terms "first", "second", and so on are intended to distinguish similar objects but do not necessarily indicate a specific order or sequence. It is to be understood that the data termed in such a way is interchangeable in proper circumstances, so that the embodiments of this application described herein can be implemented in other sequences than the sequence illustrated or described herein. Moreover, the terms "include", "contain", and any other variants thereof mean to cover the non-exclusive inclusion. For example, a process, method, system, product, or device that includes a list of steps or units is not necessarily limited to those steps or units that are clearly listed, but may include other steps or units not expressly listed or inherent to such a process, method, system, product, or device.

According to an aspect of the embodiments of this application, a method for controlling a virtual race car is provided. In one implementation, in an optional implementation, the foregoing method for controlling a virtual race car may be applied to, but is not limited to, an environment shown in FIG. 1.

Figure 1:
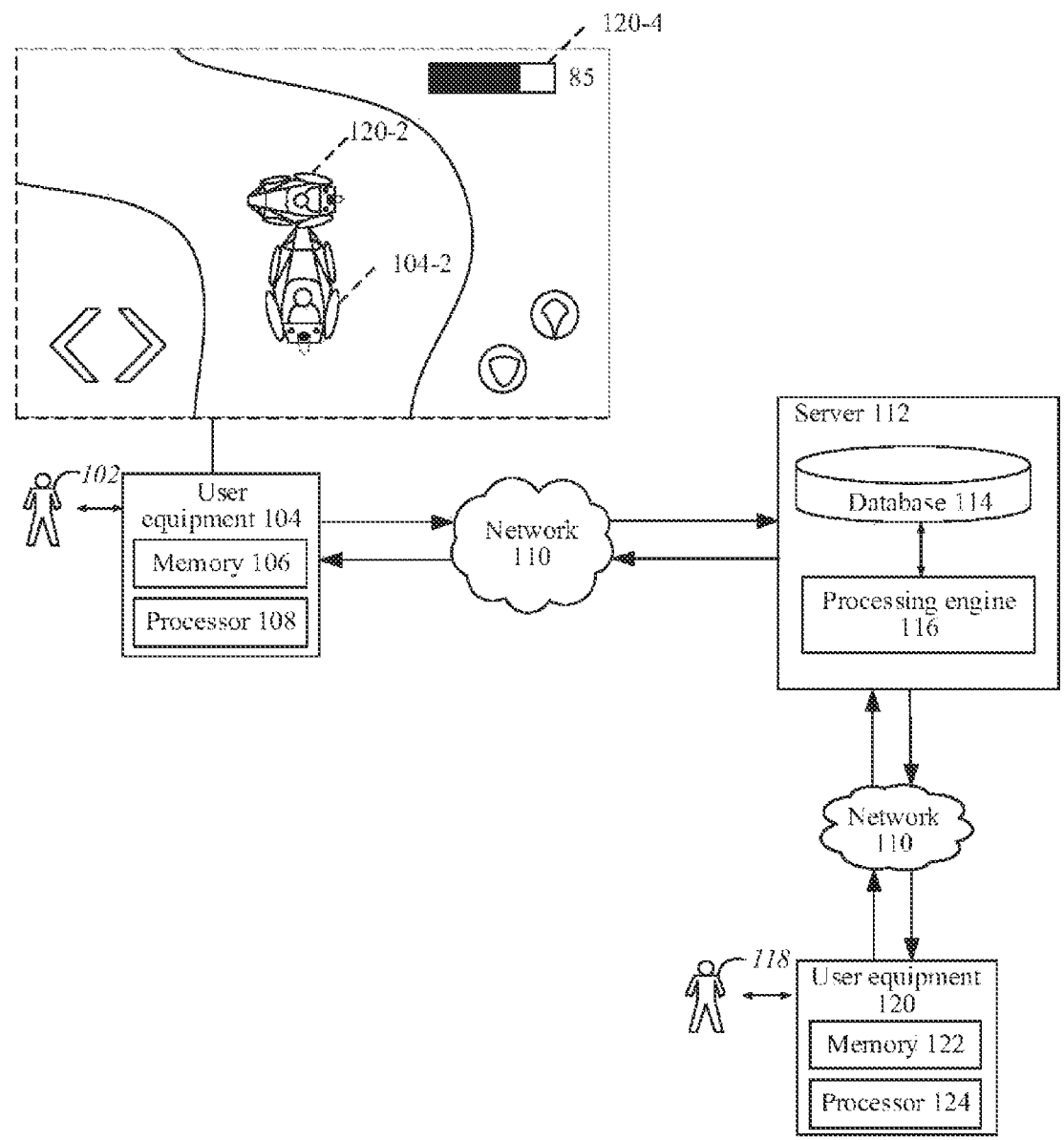
FIG. 1 is a schematic diagram of an application environment of an optional method for controlling a virtual race car according to an embodiment of this application.

In FIG. 1, a user 102 and user equipment 104 may perform man-machine interaction, and a user 118 and user equipment 120 may perform man-machine interaction. The user equipment 104 includes a memory 106, configured to store interaction data, a processor 108, configured to process the interaction data. The user equipment 120 includes a memory 122, configured to store interaction data, and a processor 124, configured to process the interaction data. The user equipment 104 and the user equipment 120 may perform data exchange with a server 112 by using a network 110. The server 112 includes a database 114, configured to store interaction data, and a processing engine 116, configured to process the interaction data. A client is run on the user equipment 104. A first account may be logged in on the client run on the user equipment 104. The client may run a round of racing game, and control a first virtual race car of the first account to move on a virtual map of the round of racing game. As shown in FIG. 1, in the round of racing game, when a first virtual race car 104-2 of the first account hits a second virtual race car 120-2, an endurance value of the second virtual race car is reduced. The client may display an endurance value 120-4 of the second virtual race car. The endurance value is 85, and may be initially 100. In a case that the endurance value of the second virtual race car is no greater than a preset threshold such as 0, it may be displayed on the client that the second virtual race car has been removed from the round of racing game.

In one implementation, the foregoing method for controlling a virtual race car may be applied to, but not limited to, a client run on the user equipment 104 or the user equipment 120 that can perform computing of data. The user equipment 104 or the user equipment 120 is, for example, a mobile phone, a tablet computer, a laptop computer, and a personal computer (PC). The network 110 may include, but is not limited to, a wireless network or a wired network. The wireless network includes: a wireless fidelity (Wi-Fi) network and other networks implementing wireless communication. The wired network may include, but is not limited to: a wide area network, a metropolitan area network, and a local area network. The server 112 may include, but not limited to, any hardware device that is capable of performing computation.

The method for controlling a virtual race car provided in the embodiments of this application may be implemented based on artificial intelligence (AI). AI is a theory, a method, a technology, and an application system that use a digital computer or a machine controlled by the digital computer to simulate, extend, and expand human intelligence, perceive an environment, obtain knowledge, and use knowledge to obtain an optimal result. In other words, AI is a comprehensive technology of computer science, which attempts to understand essence of intelligence and produces a new intelligent machine that can react in a manner similar to human intelligence. The AI is to study the design principles and implementation methods of various intelligent machines, to enable the machines to have the functions of perception, reasoning, and decision-making.

The AI technology is a comprehensive discipline, and relates to a wide range of fields including a hardware-level technology and a software-level technology. Basic AI technologies generally include technologies such as a sensor, a dedicated AI chip, cloud computing, distributed storage, a big data processing technology, an operating/interaction system, and electromechanical integration. AI software technologies mainly include several major directions such as a computer vision (CV) technology, a speech processing technology, a natural language processing technology, and machine learning (ML)/deep learning.

In the embodiments of this application, the mainly involved AI software technologies include the orientation of deep learning. For example, deep learning in ML may be involved, including various artificial neural networks.

A data processing device may have an ML capability. ML is a multi-field interdiscipline, and relates to a plurality of disciplines such as the probability theory, statistics, the approximation theory, convex analysis, and the algorithm complexity theory. ML specializes in studying how a computer simulates or implements a human learning behavior to obtain new knowledge or skills, and reorganize an existing knowledge structure, so as to keep improving its performance. ML is the core of AI, is a basic way to make the computer intelligent, and is applied to various fields of AI, ML and DL usually include technologies such as artificial neural network.

In the embodiments of this application, various artificial neural networks may be applied to implement automated control of virtual race cars in the subsequent racing game.

Figure 2:
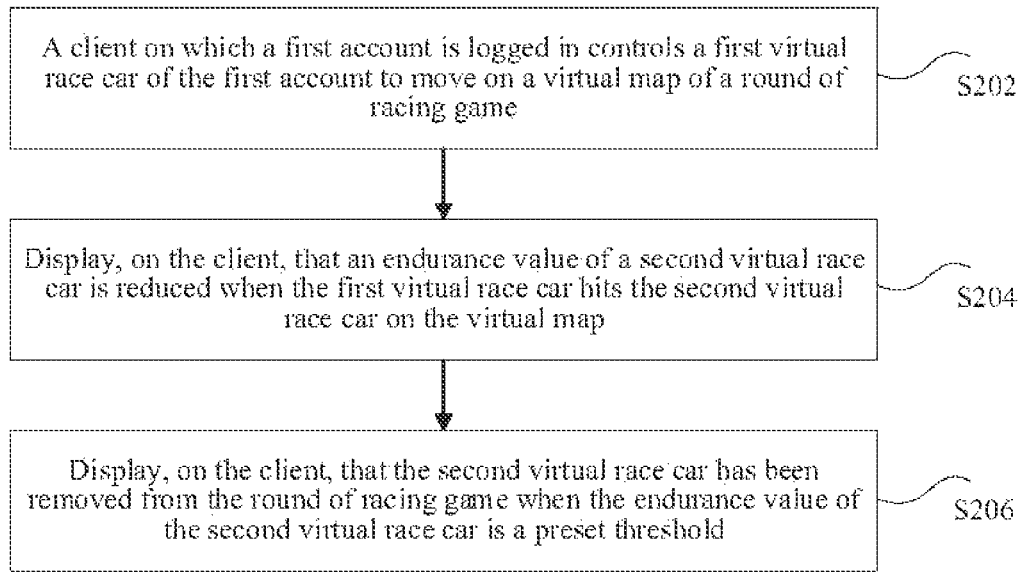
FIG. 2 is a schematic flowchart of an optional method for controlling a virtual race car according to an embodiment of this application.

In one implementation, in an optional implementation, as shown in FIG. 2, the method for controlling a virtual race car includes the following steps:

S202. A client on which a first account is logged in controls a first virtual race car of the first account to move on a virtual map of a round of racing game in a process in which the client runs the round of racing game, the first virtual race car being a pursuing race car and the first account being an account participating in the round of racing game.

S204. Display, on the client, that an endurance value of a second virtual race car is reduced when the first virtual race car hits the second virtual race car on the virtual map, the second virtual race car being a fleeing race car in the round of racing game.

S206. Display, on the client, that the second virtual race car has been removed from the round of racing game when the endurance value of the second virtual race car is no greater than a preset threshold.

In one implementation, the method for controlling a virtual race car may be applied to, but not limited to, the field of games, for example, racing games, or applied to the field of virtual training. For example, the method is applied to a racing game. A user may log in to the first account on the client to run the round of racing game. The first account uses the client to control the first virtual race car to move. The round of game further includes the second virtual race car. In the round of racing game, the first virtual race car is a pursuing race car, the second virtual race car is a fleeing race car, and the pursuing race car chases and hits the fleeing race car. The fleeing race car has an endurance value. The endurance value of the fleeing car is reduced after being hit by the pursuing race car. The fleeing race car with the endurance value being the preset threshold ends the round of racing game. The preset threshold may be a preset endurance threshold for the fleeing race car, that is, the second virtual race car to end the racing game. During specific implementation, the preset threshold may be flexibly set.

In a possible implementation, the second virtual race car may be controlled by the user. That is, the user uses a client corresponding to a second account that is logged in by the user to run the round of racing game, to control the second virtual race car. That is, the first account uses one client, and the second account uses another client, to run the same round of racing game. The second account uses the client to control the second virtual race car to move. In addition, the second virtual race car may be controlled by a device corresponding to the racing game. For example, the second virtual race car is controlled by AI. A scenario in which the second account is used to control the second virtual race car is used as an example for description below.

Figure 3:
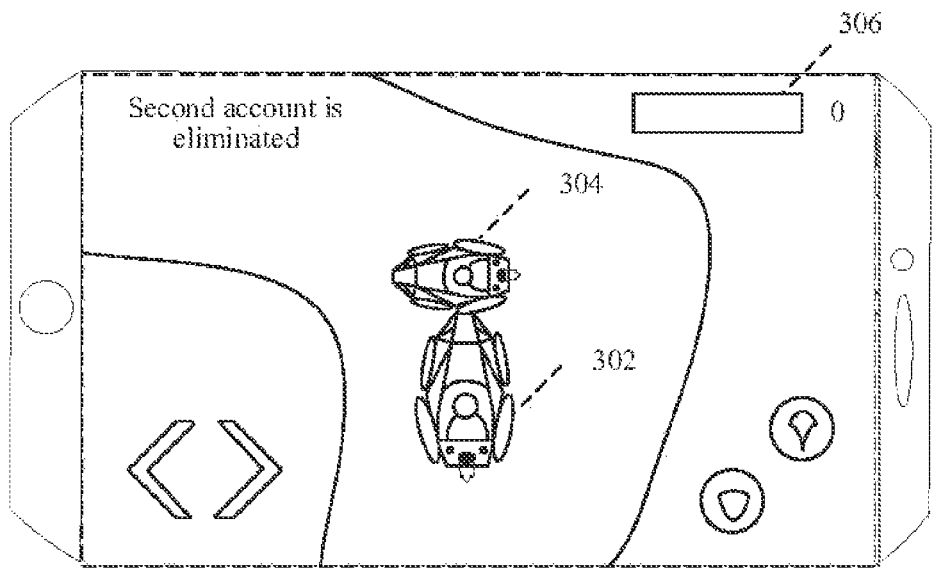
FIG. 3 is a schematic diagram of an optional method for controlling a virtual race car according to an embodiment of this application.

It is assumed that the preset threshold is zero. FIG. 3 shows an optional display interface of the client of the first account. In the round of racing game, after the first virtual race car 302 hits the second virtual race car 304, the endurance value of the second virtual race car 306 is reduced to zero. In this case, the second account corresponding to the second virtual race car is eliminated from the round of racing game. In this case, the display of the second virtual race car may be canceled on the display interface of the client of the first account, and a message indicating that the second account is eliminated may be displayed, as shown in FIG. 3.

In this embodiment, the endurance value of the second virtual race car is reduced when the first virtual race car hits the second virtual race car; and the second virtual race car ends the round of racing game when the endurance value of the second virtual race car is reduced to the preset threshold. The second virtual race car or the first virtual race car does not need to reach a preset finish line before the round of racing game can be ended, thereby improving the efficiency of ending a current round of virtual game by the second virtual race car.

In one implementation, the endurance value of the second virtual race car may be increased. For example, a preset region may be displayed on the virtual map of the round of racing game. In a case that the second virtual race car enters the preset region, the endurance value of the second virtual race car is increased. Alternatively, after the second virtual race car enters the preset region and the time for which the second virtual race car remains in the preset region is greater than first preset duration, the endurance value of the second virtual race car is increased. The preset region may appear randomly on the virtual map or appear according to a particular pattern. For example, one or more preset regions are added on the virtual map every preset period of time, or when the endurance value of the second virtual race car is relatively low, one or more preset regions are added on the virtual map.

Figure 4:
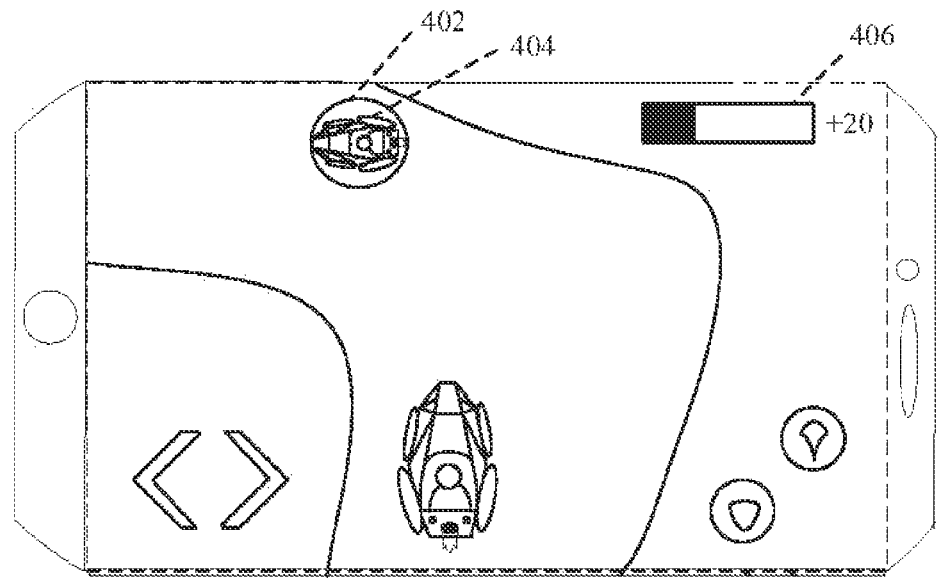
FIG. 4 is a schematic diagram of an optional method for controlling a virtual race car according to an embodiment of this application.

For example, FIG. 4 is an optional display interface of the client on which the first account is logged in. In FIG. 4, the second virtual race car 404 of the second account is located in a preset region 402, and when duration for which the second virtual race car 404 remains in the preset region 402 is greater than the first preset duration, it is displayed on the client on which the first account is logged in that the endurance value of the second virtual race car 404 is increased. For example, it is displayed in FIG. 4 that an endurance value of a second virtual race car 406 is increased by 20.

In one implementation, when the second virtual race car is located in the preset region 402, a repair mark such as "wrench" or a prompt mark such as "under repair" may further be displayed above the second virtual race car.

In one implementation, a first hit detection region may be configured for the first virtual character. The first virtual race car is located in the first hit detection region, the first hit detection region moves as the first virtual race car moves, and a size of the first hit detection region is greater than a size of the first virtual race car.

Figure 5:
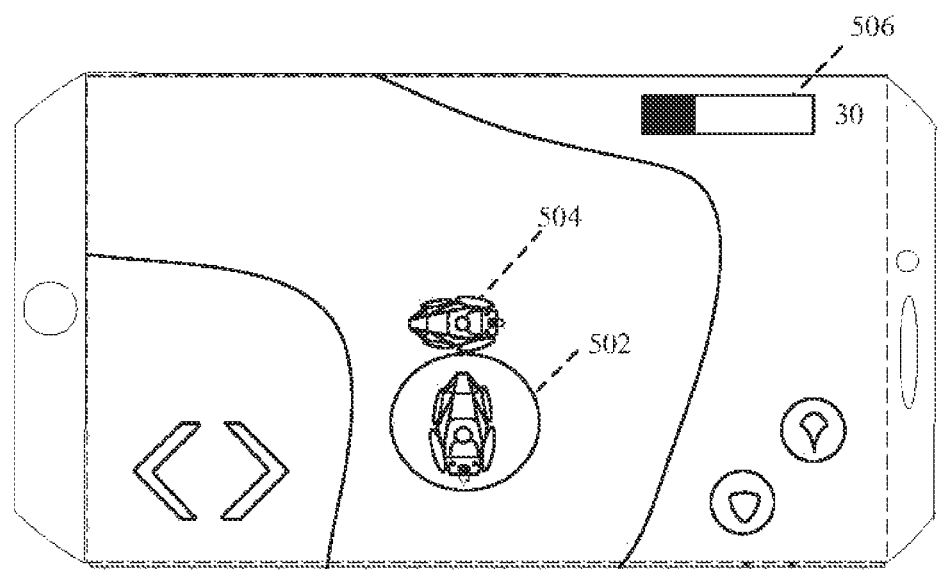
FIG. 5 is a schematic diagram of an optional method for controlling a virtual race car according to an embodiment of this application.

For example, as shown in FIG. 5, the first hit detection region may be a hit box containing the first virtual race car. The hit box is used for detecting whether the first virtual race car hits the second virtual race car. After the hit box 502 of the first virtual race car hits the second virtual race car 504, it may be considered that the first virtual race car hits the second virtual race car 504. In this case, an endurance value 506 of the second virtual race car needs to be reduced.

Figure 6:
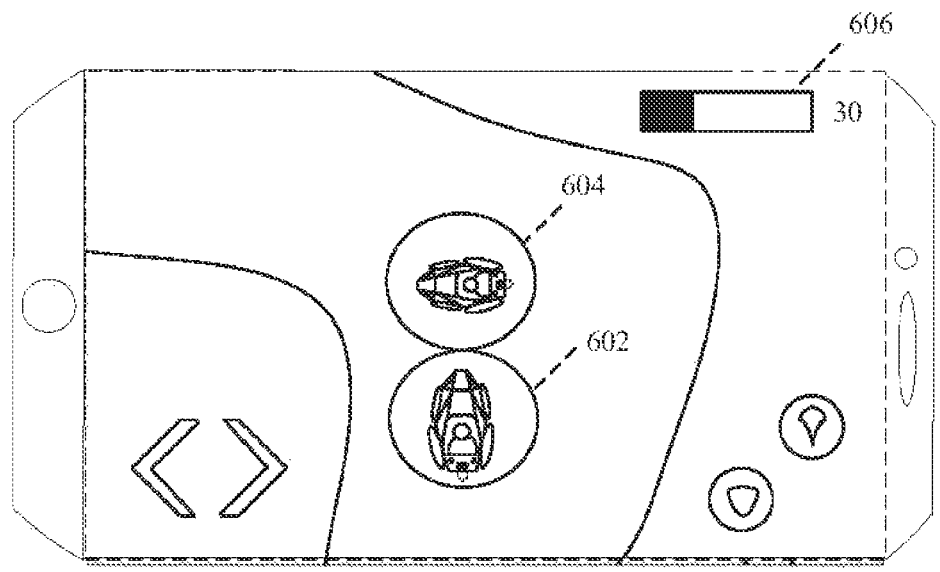
FIG. 6 is a schematic diagram of an optional method for controlling a virtual race car according to an embodiment of this application.

In one implementation, in this solution, when the first hit detection region is configured for the first virtual race car, a second hit detection region may further be configured for the second virtual race car. The second hit detection region is a region that has a size greater than the size of the second virtual race car, contains the second virtual race car, and moves as the second virtual race car moves. As shown in FIG. 6, in this case, when the first hit detection region 602 of the first virtual race car hits the second hit detection region 604 of the second virtual race car, it is considered the first virtual race car hits the second virtual race car. In this case, an endurance value 606 of the second virtual race car needs to be reduced.

In one implementation, in an optional manner, after the first virtual race car hits the second virtual race car, it may be determined whether a position of the first virtual race car hits the second virtual race car. If the head of the first virtual race car hits the second virtual race car, it is determined that the first virtual race car hits the second virtual race car. If the tail of the first virtual race car hits the second virtual race car, it is not considered that the first virtual race car hits the second virtual race car. In this case, the endurance value of the second virtual race car is not reduced. For example, the second virtual race car hits the tail of the first virtual race car. In this case, the endurance value of the second virtual race car is not reduced.

In one implementation, after the second virtual race car hits the first virtual race car, the slow motion of the hitting may be displayed on the client on which the first account is logged in and the client on which the second account is logged in. For example, after the first virtual race car hits the second virtual race car, the position information of the first virtual race car and the second virtual race car is normally synchronized to clients on which other players except the first account and the second account are logged in. A process that the first virtual race car hits the second virtual race car played on the clients on which the other players are logged in is a normal hitting process. The motion in the client on which the first account is logged in and the client on which the second account is logged in is slow motion.

Figure 7:
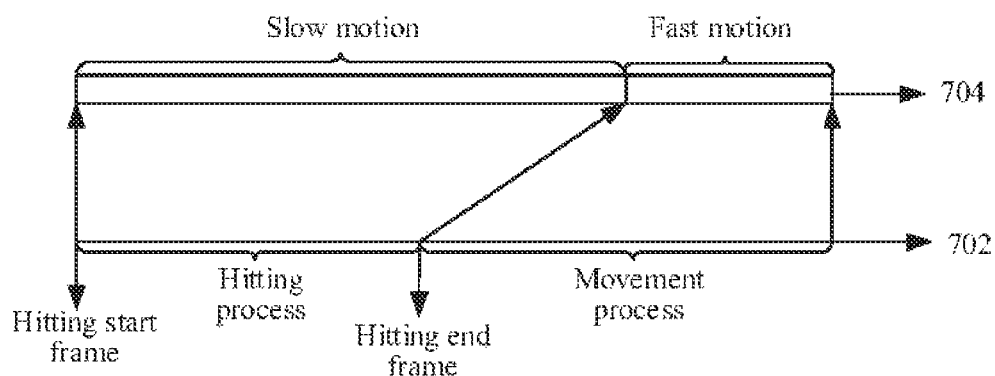
FIG. 7 is a schematic diagram of an optional method for controlling a virtual race car according to an embodiment of this application.

Description is provided with reference to FIG. 7. As shown in FIG. 7, 702 is video frames played by a client on which another account except the first account and the second account is logged in, and 704 is video frames played by a client on which the first account or the second account is logged in. For video frames of the first virtual race car and the second virtual race car in a hitting process, when the first virtual race car hits the second virtual race car, there are 10 video frames from a hit start frame to a hit end frame that contain the positions of the first virtual race car and the second virtual race car, for example, in a hitting process. There are 20 frames in a movement process of the virtual race cars after hitting. The 10 frames of the hitting process are expanded to 20 frames, so that the hitting process played by the client on which the first account is logged in and the client on which the second account is logged in is slow motion. The change of the actual position information of the first virtual race car and the second virtual race car on the virtual map become slower. After the content of the 20 frames obtained after expansion has been played, the remaining movement process after hitting needs to be played. The 20 frames of the movement process are compressed into 10 frames. In this case, a fast motion process is displayed on the client. In the hitting process, the position information of all players is synchronized to the hitting players at a frame rate less than an actual frame rate, to obtain the effect of slow motion. That is, within N frames, the two hitting players see the picture of the first N/2 frames. After the hitting ends, position information that the hitting players see is already different from actual position information. In this case, filling is performed within a subsequent short time in a continuous interpolation manner to obtain actual position information.

In one implementation, after the first virtual race car hits the second virtual race car, different display effects may be generated according to the speed and angle of the first virtual race car and the speed and angle of the second virtual race car. The display effect may be that the second virtual race car is knocked flying or knocked rolling intensely or knocked rolling slightly.

Figure 8:
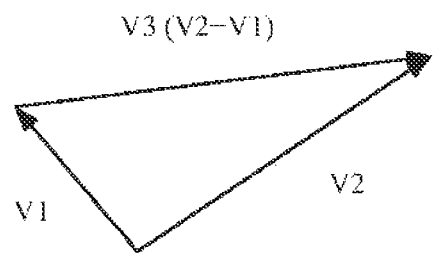
FIG. 8 is a schematic diagram of an optional method for controlling a virtual race car according to an embodiment of this application.

For example, as shown in FIG. 8, after the first virtual race car hits the second virtual race car, a speed vector V1 of the first virtual race car and a speed vector V2 of the second virtual race car are obtained. Each of V1 and V2 includes a magnitude and a direction. In this case, a movement speed V3 (V3=V2−V1) of the second virtual race car after being hit by the first virtual race car is obtained according to V1 and V2. In a case that the length of V3 is greater than a preset value such as 50, it may be displayed that the second virtual race car is knocked flying. In a case that the length is less than 50, it may be displayed that the second virtual race car is knocked rolling. After the first virtual race car hits the second virtual race car, the second virtual race car needs to be endowed with a speed greater than or equal to the speed of the first virtual race car, to prevent the first virtual race car from frequently hitting the second virtual race car within a relatively short time. After the speed and status of the second virtual race car after hitting are determined, the direction of the second virtual race car after hitting further needs to be determined. A movement direction of the second virtual race car after hitting is a direction of the second virtual race car relative to the first virtual race car. For example, the second virtual race car is located on the right side of the first virtual race car, after the first virtual race car hits the second virtual race car, the second virtual race car rolls toward the right side of the first virtual race car.

Figure 9:
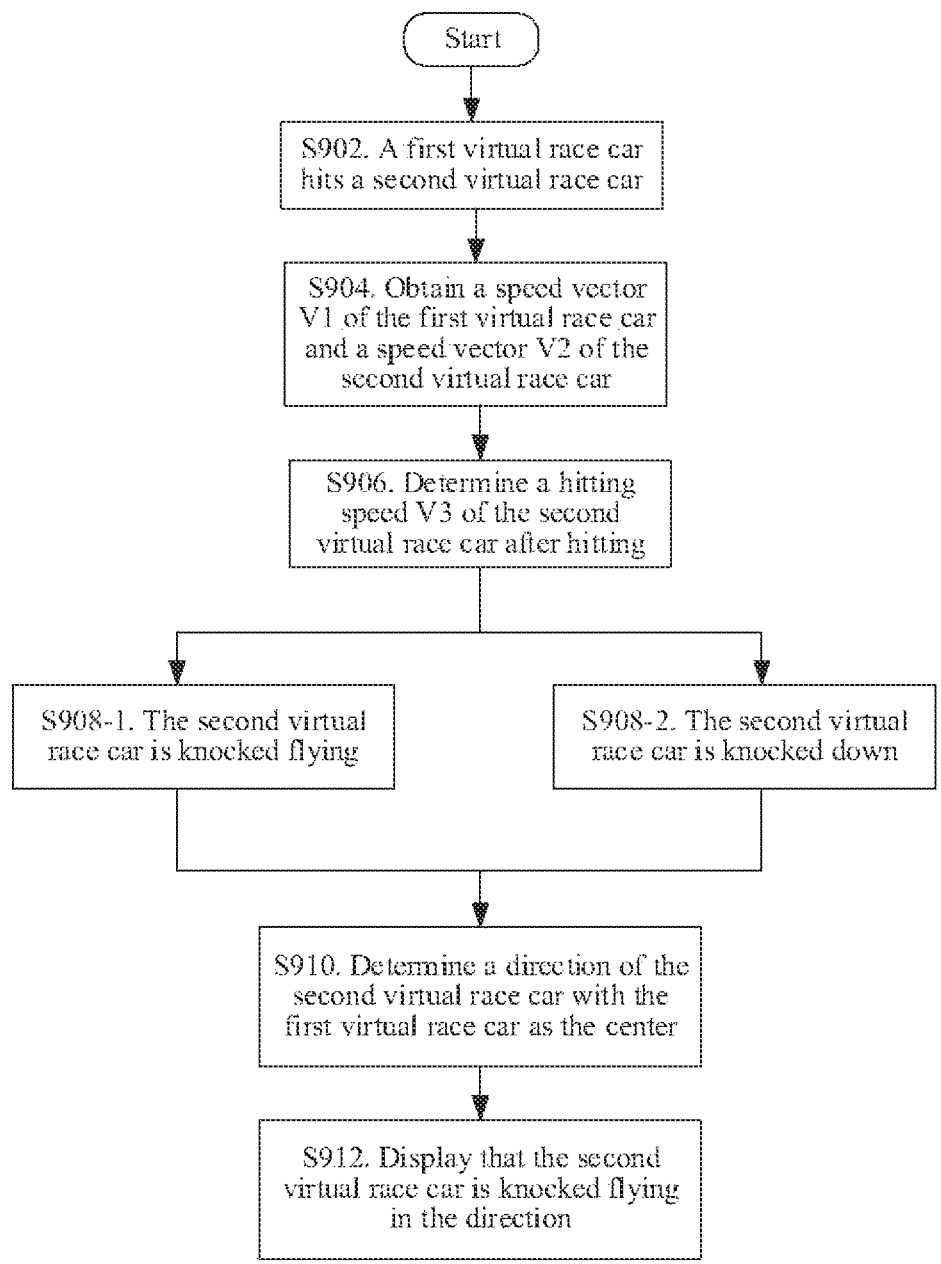
FIG. 9 is a schematic flowchart of an optional method for controlling a virtual race car according to an embodiment of this application.

A hitting process is described with reference to S902 to S912 of FIG. 9.

S902: A first virtual race car hits a second virtual race car.

S904: Obtain a speed vector V1 of the first virtual race car and a speed vector V2 of the second virtual race car.

S906: Determine a hitting speed V3 of the second virtual race car after hitting.

In a case that the first virtual race car hits the second virtual race car, a speed vector V1 of the first virtual race car and a speed vector V2 of the second virtual race car are obtained. A speed V3 of the second virtual race car after hitting is determined with reference to the method shown in FIG. 8.

S908-1: The second virtual race car is knocked flying.

S908-2: The second virtual race car is knocked down.

S910: Determine a direction of the second virtual race car with the first virtual race car as the center.

S912: Display that the second virtual race car is knocked flying in the direction.

The status such as being knocked flying or being knocked down of the second virtual race car is determined according to V3. A direction of the second virtual race car with the first virtual race car as the center during hitting is then determined. It is then displayed that the second virtual race car is knocked flying in the direction.

In this embodiment, in the foregoing method, the endurance value of the second virtual race car is reduced when the first virtual race car hits the second virtual race car; and the second virtual race car ends the round of racing game when the endurance value of the second virtual race car is reduced to zero. The second virtual race car or the first virtual race car does not need to reach a preset finish line before the round of racing game can be ended, thereby improving the efficiency of ending a current round of virtual game by the second virtual race car.

In one implementation, during the controlling, by a client, a first virtual race car of the first account to move on a virtual map of the round of racing game, the method further includes:

(1) determining that the first virtual race car hits the second virtual race car when the second virtual race car is contacted in a first hit detection region in which the first virtual race car is located, a size of the first hit detection region being greater than a size of the first virtual race car, the first virtual race car being located in the first hit detection region, the first hit detection region moving as the first virtual race car moves; or (2) determining that the first virtual race car hits the second virtual race car when a second hit detection region in which the second virtual race car is located is contacted in a first hit detection region in which the first virtual race car is located, a size of the first hit detection region being greater than a size of the first virtual race car, the first virtual race car being located in the first hit detection region, the first hit detection region moving as the first virtual race car moves, a size of the second hit detection region being greater than a size of the second virtual race car, the second virtual race car being located in the second hit detection region, the second hit detection region moving as the second virtual race car moves.

In one implementation, the first hit detection region is a hit box that is configured for the first virtual race car and is used for detecting hitting. For example, the first hit detection region is a hit box 502 shown in FIG. 5. In a case that the hit box 502 hits the second virtual race car, it is determined that the first virtual race car hits the second virtual race car.

In a case that the second virtual race car is configured with the second hit detection region such as a hit box, for example, a hit box 604 shown in FIG. 6 and the hit box 602 of the first virtual race car hits the hit box 604 of the second virtual race car, it is determined that the first virtual race car hits the second virtual race car.

In one implementation, in an optional case, it may be set that the hit box 602 of the first virtual race car and/or the hit box 604 of the second virtual race car has a clearer display effect when hitting is about to occur. For example, the hit box of the first virtual race car is translucent. When the distance to the second virtual race car is smaller, the transparency is lower.

For example, a pursuing player has a special effect that has a size the same as that of the hit box and is repeatedly played, like an electromagnetic wave. Such a special effect of electromagnetic wave is translucent. When the distance to the fleeing player is smaller, the electromagnetic effect is clearly enhanced.

In this embodiment, while the efficiency of ending the round of virtual game by the second virtual race car is improved, a detection region is configured for the first virtual race car and/or the second virtual race car, thereby improving the detection efficiency of detecting whether the first virtual race car hits the second virtual race car.

In one implementation, during the controlling, by a client, a first virtual race car of the first account to move on a virtual map of a round of racing game, the method further includes the following step:

S1. Display, on the client, that the endurance value of the second virtual race car is increased when the second virtual race car remains within a preset region on the virtual map longer than a first preset duration.

In one implementation, the preset region may be a relatively large region such as a region that can surround a plurality of fleeing virtual race cars, or is a relatively small region such as a region that can include one fleeing virtual race car at once. After the fleeing second virtual race car enters the preset region, the endurance value of the second virtual race car may be increased. Alternatively, the second virtual race car needs to remain in the preset region for a particular time such as 3 seconds before the endurance value can be increased for the second virtual race car. The shape of the preset region is not limited in this embodiment.

In this embodiment, while the efficiency of ending the round of virtual game by the second virtual race car is improved, the preset region is provided on the virtual map, thereby ensuring that the second virtual race car can restore a partial or complete endurance value, to improve the flexibility that the second virtual race car chooses to end the current round of game.

In one implementation,
S1. before the second virtual race car remains in the preset region on the virtual map longer than the first preset duration, the method further includes: displaying the preset region on the virtual map; and
S2. when the second virtual race car remains in the preset region on the virtual map longer than the first preset duration, the method further includes: canceling the display of the preset region on the virtual map.

In one implementation, the preset region may appear randomly on the virtual map, or appear every preset time, or appear according to the endurance value of the status of the second virtual race car. After the preset region is used by one second virtual race car (after the endurance value is increased for the second virtual race car when the time for which the second virtual race car is located in the preset region is greater than a first preset threshold), the display of the preset region is canceled, or the preset region is displayed in a different state, representing that the preset region is currently unusable.

In this embodiment, while the efficiency of ending the round of virtual game by the second virtual race car is improved, the preset region is displayed on the virtual map, and the display of the preset region is canceled after the preset region is used, thereby improving the flexibility of displaying the preset region, to further improve the flexibility of ending the current round of game by the second virtual race car.

In one implementation, the method further includes the following steps:
S1. Cancel the display of the preset region on the virtual map when the round of racing game reaches a countdown start moment.

In one implementation, the countdown may be started after a period of time since the game is started. For example, after 3 minutes since the game is started, the countdown of 1 minute is started. Within the time of the countdown, the preset region on the virtual race track disappears. In this case, the second virtual race car cannot use the preset region to restore the endurance value. The game enters a "crazy time".

In this embodiment, while the efficiency of ending the round of virtual game by the second virtual race car is improved, the display of the preset region is canceled in a countdown stage, to prevent the second virtual race car from frequently restoring the endurance value, thereby improving the flexibility of ending the current round of game by the second virtual race car.

In one implementation, during the controlling, by a client, a first virtual race car of the first account to move on a virtual map of a round of racing game, the method further includes:
(1) displaying, on the client, that the round of racing game has ended and the first virtual race car loses when first preset duration after the round of racing game is started has ended and there is a fleeing race car with an endurance value being greater than the preset threshold; or
(2) displaying, on the client, that the round of racing game has ended and the first virtual race car wins when first preset duration after the round of racing game is started has ended and there is no fleeing race car with an endurance value being greater than the preset threshold.

In one implementation, if the endurance value of the second virtual race car is the preset threshold, the second virtual race car is eliminated from a single round of game. If all fleeing race cars have been eliminated from the single round of game, all pursuing cars including the first virtual race car in the round of game win the victory of the current round of game. If a fleeing virtual race car is still not eliminated within a specified time, all pursuing virtual race cars are eliminated from the single round of game, and all fleeing cars win the victory of the round of game.

In this embodiment, while the efficiency of ending the round of virtual game by the second virtual race car is improved, winners and losers of the current round of game are determined by using the method, thereby improving the efficiency of ending the round of racing game.

In one implementation, during the controlling, by a client, a first virtual race car of the first account to move on a virtual map of a round of racing game, the method further includes:

S1. displaying, on the client, a first limit region set on the virtual map; and performing any one or combination of the following manners:

reducing any one or combination of the speed, acceleration, acceleration time, and endurance value of the second virtual race car when the second virtual race car enters the first limit region; and increasing any one or combination of the speed, acceleration, and acceleration time of the first virtual race car when the first virtual race car enters the first limit region.

In one implementation, the first limit region is a region that appears randomly on the virtual map. For example, one limit region is displayed on the virtual map every preset time. Any one or combination of the speed, acceleration, and acceleration time of the first virtual race car is increased after the first virtual race car enters the first limit region. Alternatively, any one or combination of the speed, acceleration, acceleration time, and endurance value of the second virtual race car is reduced after the second virtual race car enters the first limit region. Alternatively, after the first virtual race car enters the first limit region, any one or combination of the speed, acceleration, and acceleration time of the first virtual race car is increased, and after the second virtual race car enters the first limit region, any one or combination of the acceleration, acceleration time, and endurance value of the second virtual race car is reduced.

Figure 10:
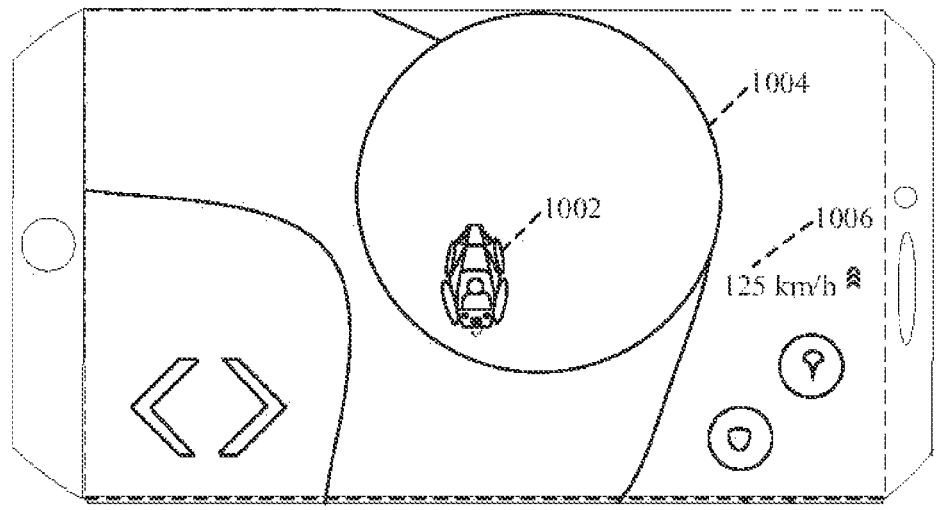
FIG. 10 is a schematic diagram of an optional method for controlling a virtual race car according to an embodiment of this application.

An example in which the first virtual race car enters the first limit region is used. FIG. 10 shows an optional display interface of the client on which the first account is logged in. After a first virtual race car 1002 in FIG. 10 enters a first limit region 1004, a speed 1006 of the first virtual race car is increased.

In this embodiment, while the efficiency of ending the round of virtual game by the second virtual race car is improved, the first limit region is used to change the status of the first virtual race car or the second virtual race car or change both the statuses of the two virtual race cars, thereby improving the versatility of the statuses of virtual race cars in the round of game.

In one implementation, after the displaying, on the client, a first limit region set on the virtual map, the method further includes:

S1. canceling the display of the first limit region on the client after the display of the first limit region reaches second preset duration, the setting of the first limit region being canceled on the virtual map;

S2. displaying, on the client, a second limit region set on the virtual map; and performing any one or combination of the following manners:

reducing any one or combination of the speed, acceleration, acceleration time, and endurance value of the second virtual race car when the second virtual race car enters the second limit region; and increasing any one or combination of the speed, acceleration, and acceleration time of the first virtual race car when the first virtual race car enters the second limit region.

Figure 11:
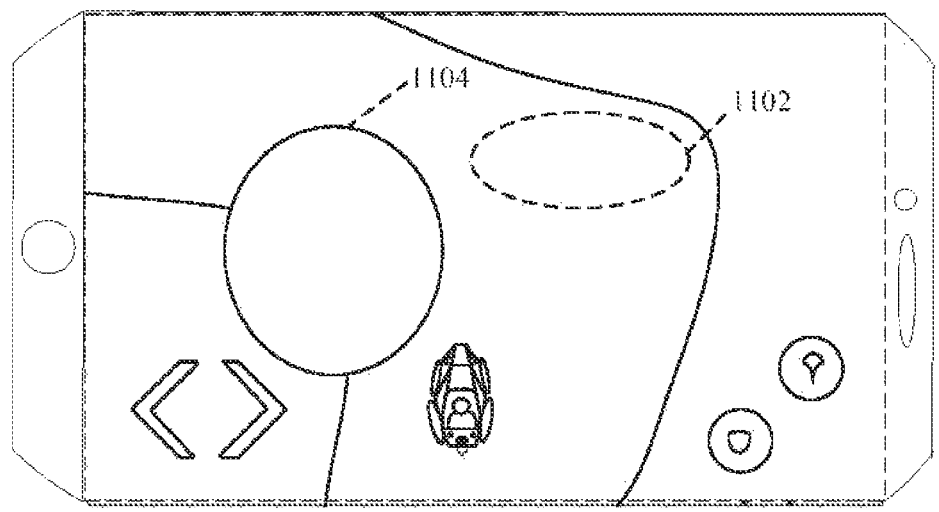
FIG. 11 is a schematic diagram of an optional method for controlling a virtual race car according to an embodiment of this application.

In one implementation, the description is continued with reference to the case of increasing the first limit region. After lasting a particular time on the virtual map, the first limit region may disappear, that is, the first limit region is removed, and the second limit region is displayed in another region on the virtual map. FIG. 11 is a display diagram of an optional limit region on a virtual map. 1102 in FIG. 11 is the first limit region, the first limit region is removed, and the second limit region 1104 is displayed.

In this embodiment, while the efficiency of ending the round of virtual game by the second virtual race car is improved, the first limit region is removed and the second limit region is displayed, thereby improving the flexibility of configuring limit regions.

In one implementation, after the displaying, on the client, a first limit region set on the virtual map, the method further includes:

S1. displaying, on the client, a second limit region set on the virtual map; and performing any one or combination of the following manners:

reducing any one or combination of the speed, acceleration, acceleration time, and endurance value of the second virtual race car when the second virtual race car enters the second limit region; and increasing any one or combination of the speed, acceleration, and acceleration time of the first virtual race car when the first virtual race car enters the second limit region.

Figure 12:
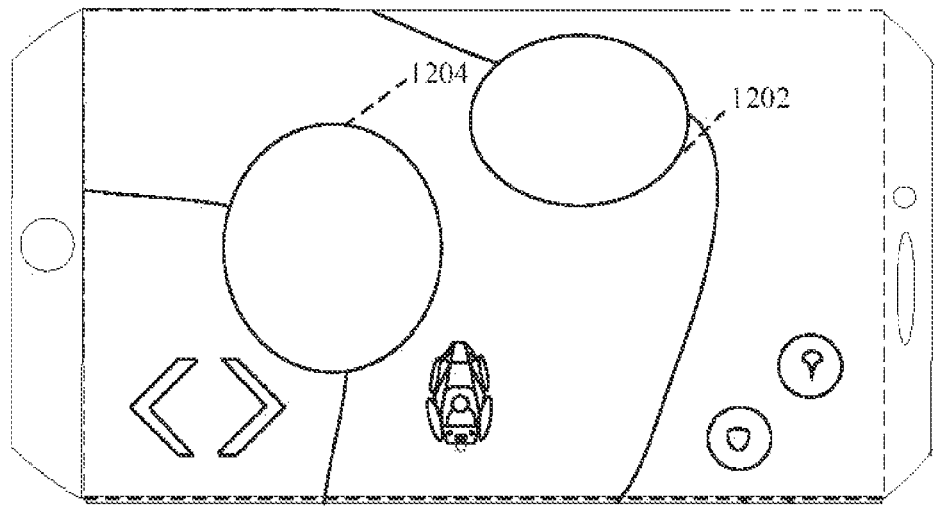
FIG. 12 is a schematic diagram of an optional method for controlling a virtual race car according to an embodiment of this application.

In one implementation, the description is continued with reference to the case of displaying the first limit region. After the first limit region is displayed for a preset time, on the basis of maintaining the display of the first limit region, the second limit region is added. As shown in FIG. 12, a second limit region 1204 is displayed after a first limit region 1202 is displayed. The first limit region and the second limit region are displayed together, until the game ends.

In this embodiment, while the efficiency of ending the round of virtual game by the second virtual race car is improved, the first limit region is displayed and the second limit region is then displayed, thereby improving the flexibility of configuring limit regions.

In one implementation, the first limit region and the second limit region are set in any one or combination of the following manners: the first limit region and the second limit region are regions randomly set on the virtual map; the first limit region is smaller than the second limit region; and the first limit region is contained in the second limit region, and the first limit region overlaps the second limit region.

In one implementation, the first limit region and the second limit region may partially overlap. For example, the first limit region and the second limit region partially overlap together. The first limit region and the second limit region may be contained in one another. For example, the second limit region contains the first limit region and is larger than the first limit region, to implement that a limit region becomes increasingly large and a non-limit region becomes increasingly small.

In one implementation, when a fleeing player enters a blocking region, the travel speed and acceleration of the fleeing player are quickly reduced to 0.2 of the normal travel speed and acceleration respectively, and the position information of the fleeing player is synchronized to the pursuing player on a mini-map. As the game progresses, after every fixed time, one blocking region is randomly added on the map, making the game experience more intense and exciting. In the art representation, the blocking region is a semispherical region. A warning caution is provided at a boundary of the blocking region, and at the same time an effect of electromagnetic interference is provided in the blocking region.

In this embodiment, while the efficiency of ending the round of virtual game by the second virtual race car is improved, the first limit region and the second limit region are flexibly combined, thereby improving the flexibility of configuring limit regions.

In one implementation, during the controlling, by a client, a first virtual race car of the first account to move on a virtual map of a round of racing game, the method further includes the following step:

S1. Display a mini-map of the virtual map on the client, the mini-map being used for displaying the positions of the first virtual race car and the second virtual race car on the virtual map.

Figure 13:
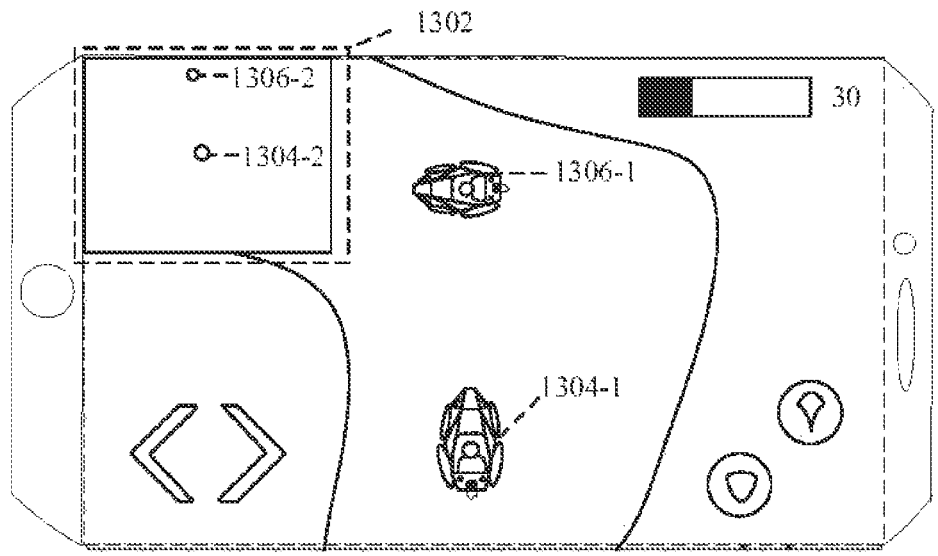
FIG. 13 is a schematic diagram of an optional method for controlling a virtual race car according to an embodiment of this application.

In one implementation, the mini-map in this embodiment may be displayed at any position on the client, or the mini-map is not displayed by default and is displayed when a display instruction is received. The positions of the first virtual race car and/or the second virtual race car may be displayed on the mini-map. FIG. 13 shows an optional display interface of the client on which the first account is logged in. A mini-map 1302 is displayed in FIG. 13. A position 1304-2 of a first virtual race car 1304-1 and a position 1306-2 of a second virtual race car 1306-1 are displayed on the mini-map 1302.

In this embodiment, while the efficiency of ending the round of virtual game by the second virtual race car is improved, the mini-map is displayed, thereby improving the display efficiency of displaying the first virtual race car and the second virtual race car.

In one implementation, a manner of displaying the mini-map on the client includes any one or combination of the following:

(1) hiding the position of the second virtual race car on the mini-map displayed on the client when a distance between the second virtual race car and the first virtual race car is greater than a first threshold; and/or (2) displaying the position of the second virtual race car for third preset duration on the mini-map every fourth preset duration after the round of racing game is started; and (3) displaying the position of the second virtual race car on the mini-map displayed on the client when the round of racing game reaches the countdown start moment.

In one implementation, the position of the first virtual race car or the second virtual race car in this embodiment may be displayed on the mini-map according to a particular condition. For example, the client on which the first account is logged in is used as an example. For example, the first virtual race car is relatively far away from the second virtual race car, and the position of the second virtual race car is not displayed on the mini-map. In a case that the first virtual race car is relatively close to the second virtual race car, the position of the second virtual race car is displayed on the mini-map. Alternatively, the position of the second virtual race car may be periodically displayed on the mini-map. For example, the position of the second virtual race car is displayed for one second (that is, the third preset duration) for every 10 seconds (that is, the fourth preset duration). Alternatively, when there is still 60 seconds before the game ends, the position of the second virtual race car is displayed on the mini-map. For example, FIG. 14 includes the mini-map 1402 displayed by the client on which the first account is logged in. The position 1404 of the first virtual race car is displayed on the mini-map. A circular region 1406 may be a detection range, and a region other than the circular region 1406 is covered in mist and is invisible. A position 1408 of the second virtual race car and a position 1410 of a third virtual race car that is also a pursuing virtual race car like the first virtual race car are displayed in the circular region 1406. The position of a virtual race car in mist is not displayed on the mini-map.

In one implementation, after every fixed time, a mistless state is kept for 3 seconds on the mini-map of a pursuing player. In this case, the pursuing player may obtain the position information of all players, can discover the position of a fleeing player, and may plan a subsequent chase route according to this. This innovation can fully ensure the intensity of competition, and make a single round maintain an intense and exciting rhythm. In the 3-second mistless state, a visual representation of radar scanning is provided on the mini-map.

After there is only one last fleeing player left in the field or the countdown enters the last 60 seconds, the game enters a "crazy time" stage. Within a time from this point to the end of the game, all repair points in the field disappear, the mist disappears on the mini-maps of the pursuing and fleeing players, and position information of all players is obtained.

In this embodiment, while the efficiency of ending the round of virtual game by the second virtual race car is improved, it is determined according to different cases whether to display the position of the second virtual race car, thereby improving the flexibility of displaying the position of the second virtual race car.

In one implementation, when the round of racing game is started, the method further includes. the following step:

S1. Display, on the client, that a first initial position of the first virtual race car on the virtual map remains unchanged within fourth preset duration after the round of racing game is started, it being set that the first virtual race car is not allowed within the fourth preset duration to start moving from the first initial position, it being set that the second virtual race car is allowed to start moving from a second initial position on the virtual map when the round of racing game is started.

In one implementation, the fourth preset duration is preset duration, for example, 4 seconds. When the game is started, the fleeing second virtual race car may start to move, and the first virtual race car is not allowed to move within 4 seconds after start. The first virtual race car can move after 4 seconds since the start.

In this embodiment, while the efficiency of ending the round of virtual game by the second virtual race car is improved, the first virtual race car is controlled to remain at the same position within the fourth preset duration after the game is started, thereby ensuring the fairness of the game.

In one implementation, the virtual map includes any one or combination of the following race tracks: a race track having both an underground structure and a ground structure; and a circular race track with a height difference.

In one implementation, the virtual map in this embodiment may include one or more of race tracks such as a platform, a linear race track, a curved race track, a double-layer race track, a circular race track, an acceleration race track, and a tunnel. The virtual race track may be designed into an open race track, a player may choose from a plurality of paths, and at the same time various skill test points are provided in the race track.

In a map design, in addition to the design of a race track route in a plane, and a spatial structure design of a race track is further increased, including: a circular race track having a height difference (a race car may fly down from a high position to enter a race track at a low position, a race car at a low position may enter a race track at a high position via two upslopes, and an item for entering or leaving this region is provided on a race track at a high position), a region having an underground structure and a ground structure, or the like.

In this embodiment, while the efficiency of ending the round of virtual game by the second virtual race car is improved, a virtual race track is designed, so that virtual race tracks have varied styles, thereby improving the flexibility of choosing a path by the second virtual race car in a game process.

For ease of description, the foregoing method embodiments are stated as a combination of a series of action combinations. However, persons skilled in the art are to know that this application is not limited to, the described action sequence, because according to this application, some steps may be performed in another sequence or simultaneously. In addition, persons skilled in the art are also to understand that the embodiments described in this specification are all exemplary embodiments, and the involved actions and modules are not necessarily required to this application.

According to an aspect of the embodiments of this application, a method for controlling a virtual race car is further provided. As shown in FIG. 15, the method includes the following steps:

S1502. A client on which a second account is logged in controls a second virtual race car of the second account to move on a virtual map of a round of racing game, the second virtual race car being a fleeing race car and the second account being an account participating in the round of racing game.

S1504. Display, on the client, that an endurance value of the second virtual race car is reduced when the second virtual race car is hit by a first virtual race car on the virtual map, the first virtual race car being a pursuing race car in the round of racing game.

S1506. Display, on the client, that the second virtual race car has been removed from the round of racing game when the endurance value of the second virtual race car is no greater than a preset threshold.

In one implementation, the method for controlling a virtual race car may be applied to, but not limited to, the field of games, for example, racing games, or applied to the field of virtual training. For example, the method is applied to a racing game. A user may log in to the second account on the client to run the round of racing game, and the second account uses the client to control the second virtual race car to move. The round of game further includes a first virtual race car. In the round of racing game, the first virtual race car is a pursuing race car, the second virtual race car is a fleeing race car, and the pursuing race car chases and hits the fleeing race car. The fleeing race car has an endurance value. The endurance value of the fleeing car is reduced after being hit by the pursuing race car. The fleeing race car with the endurance value being zero ends the round of racing game. After the second virtual race car is hit by the pursuing race car and the endurance value of the second virtual race car is the preset threshold, the second virtual race car is eliminated from the round of racing game. The preset threshold may be a preset endurance threshold for the fleeing race car, that is, the second virtual race car to end the racing game. During specific implementation, the preset threshold may be flexibly set.

In this case, a message indicating that the second virtual race car is eliminated may be displayed on the client on which the second account is logged in. A viewpoint of the client on which the second account is logged in may be switched to a viewpoint of another fleeing player that has not been eliminated.

In this embodiment, the endurance value of the second virtual race car is reduced when the first virtual race car hits the second virtual race car; and the second virtual race car ends the round of racing game when the endurance value of the second virtual race car is reduced to zero. The second virtual race car or the first virtual race car does not need to reach a preset finish line before the round of racing game can be ended, thereby improving the efficiency of ending a current round of virtual game by the second virtual race car.

In a possible implementation, the first virtual race car may be controlled by the user. That is, the user uses a client corresponding to a first account that is logged in by the user to run the round of racing game, to control the first virtual race car. That is, the first account uses one client, and the second account uses another client, to nm the same round of racing game. The first account uses the client to control the first virtual race car to move. In addition, the first virtual race car may be controlled by a device corresponding to the racing game. For example, the first virtual race car is controlled by AI. In one implementation, during the controlling, by a client, a second virtual race car of the second account to move on a virtual map of a round of racing game, the method further includes the following step:

S1. Display, on the client, that the endurance value of the second virtual race car is increased when the second virtual race car remains within a preset region on the virtual map longer than a first preset duration.

In one implementation, the endurance value of the second virtual race car may be increased. For example, the preset region may be displayed on the virtual map of the round of racing game. In a case that the second virtual race car enters the preset region, the endurance value of the second virtual race car is increased. Alternatively, after the second virtual race car enters the preset region and the time for which the second virtual race car remains in the preset region is greater than the first preset duration, the endurance value of the second virtual race car is increased. The preset region may appear randomly on the virtual map or appear according to a particular pattern. For example, one or more preset regions are added on the virtual map every preset period of time, or when the endurance value of the second virtual race car is relatively low, one or more preset regions are added on the virtual map.

Figure 16:
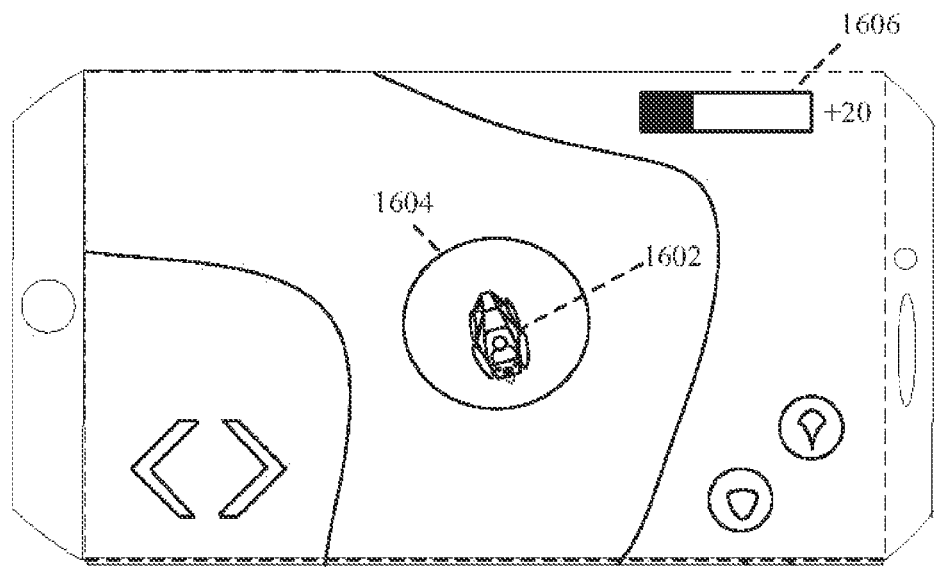
FIG. 16 is a schematic diagram of an optional method for controlling a virtual race car according to an embodiment of this application.

For example, FIG. 16 is an optional display interface of the client on which the second account is logged in. After a second virtual race car 1602 enters a preset region 1604 and remains for the first preset duration, the endurance value 1606 of the second virtual race car is increased.

In this embodiment, on the basis of improving the efficiency of ending a current round of virtual game by the second virtual race car, the preset region is added to restore the endurance value of the second virtual race car, thereby ensuring that the second virtual race car can restore a partial or complete endurance value, to improve the flexibility that the second virtual race car chooses to end the current round of game.

In one implementation, during the controlling, by a client, a second virtual race car of the second account to move on a virtual map of a round of racing game, the method further includes the following step:

S1. Display, on the client, a first limit region set on the virtual map; and perform any one or combination of the following manners: reducing any one or combination of the speed, acceleration, acceleration time, and endurance value of the second virtual race car when the second virtual race car enters the first limit region; and increasing any one or combination of the speed, acceleration, and acceleration time of the first virtual race car when the first virtual race car enters the first limit region.

Figure 17:
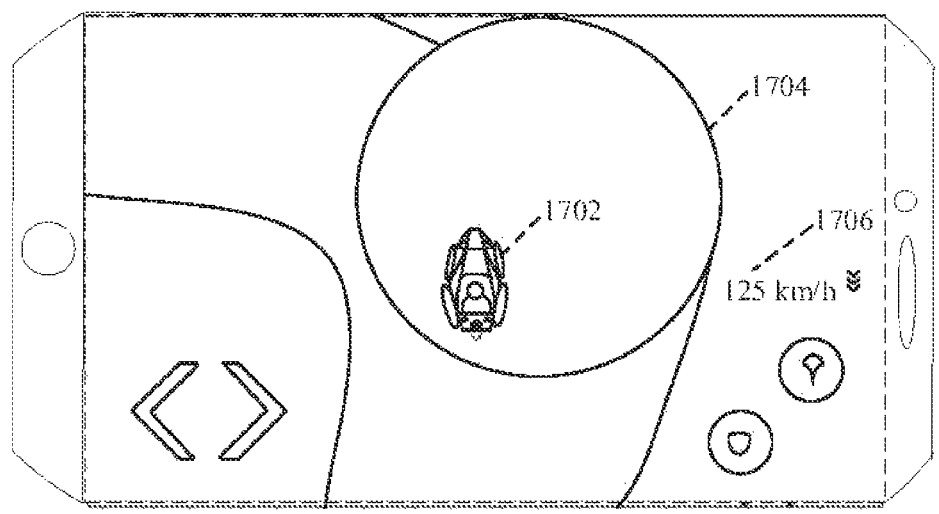
FIG. 17 is a schematic diagram of an optional method for controlling a virtual race car according to an embodiment of this application.

For example, an example in which the speed of the second virtual race car is reduced after the second virtual race car enters the first limit region is used. FIG. 17 shows an optional display interface of the client on which the second account is logged in. After the second virtual race car 1702 enters the first limit region 1704, the speed 1706 of the second virtual race car is reduced, and the speed of the second virtual race car is restored after the second virtual race car leaves the first limit region.

In this embodiment, while the efficiency of ending the round of virtual game by the second virtual race car is improved, the first limit region is used to change the statuses of the first virtual race car and/or the second virtual race car, thereby improving the versatility of the statuses of virtual race cars in the round of game.

For other implementations of this embodiment, reference may be made to the description of the foregoing embodiments, and details are not described herein.

Figure 18:
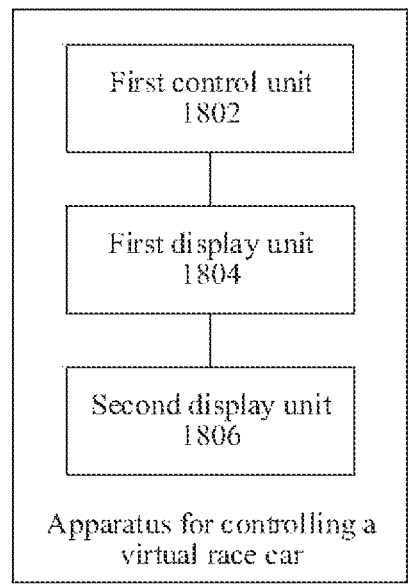
FIG. 18 is a schematic structural diagram of an optional apparatus for controlling a virtual race car according to an embodiment of this application.

According to an aspect of the embodiments of this application, an apparatus for controlling a virtual race car configured to implement the foregoing method for controlling a virtual race car is further provided. As shown in FIG. 18, the apparatus includes:
  (1) a first control unit 1802, configured to control a first virtual race car of a first account to move on a virtual map of a round of racing game in a process in which a client on which the first account is logged in runs the round of racing game, the first virtual race car being a pursuing race car in the round of racing game;
  (2) a first display unit 1804, configured to display, on the client, that an endurance value of a second virtual race car is reduced when the first virtual race car hits the second virtual race car on the virtual map, the second virtual race car being a fleeing race car in the round of racing game, the first account being an account participating in the round of racing game; and
  (3) a second display unit 1806, configured to display, on the client, that the second virtual race car has been removed from the round of racing game when the endurance value of the second virtual race car is no greater than a preset threshold.

In one implementation, the apparatus for controlling a virtual race car may be applied to, but not limited to, the field of games, for example, racing games, or applied to the field of virtual training. For example, the method is applied to a racing game. A user may log in to the first account on the client to run the round of racing game. The first account uses the client to control the first virtual race car to move. The round of game further includes the second virtual race car. In the round of racing game, the first virtual race car is a pursuing race car, the second virtual race car is a fleeing race car, and the pursuing race car chases and hits the fleeing race car. The fleeing race car has an endurance value. The endurance value of the fleeing car is reduced after being hit by the pursuing race car. The fleeing race car with the endurance value being the preset threshold ends the round of racing game.

FIG. 3 shows an optional display interface of the client of the first account. In the round of racing game, after the first virtual race car 302 hits the second virtual race car 304, the endurance value of the second virtual race car 306 is reduced to zero. In this case, the second account corresponding to the second virtual race car is eliminated from the round of racing game. In this case, the display of the second virtual race car may be canceled on the display interface of the client of the first account, a message indicating that the second account is eliminated may be displayed, as shown in FIG. 3.

In this embodiment, the endurance value of the second virtual race car is reduced when the first virtual race car hits the second virtual race car; and the second virtual race car ends the round of racing game when the endurance value of the second virtual race car is reduced to zero. The second virtual race car or the first virtual race car does not need to reach a preset finish line before the round of racing game can be ended, thereby improving the efficiency of ending a current round of virtual game by the second virtual race car.

In one implementation, the second virtual race car is a virtual race car of a second account in the process of the round of racing game, and the second account is an account participating in the round of racing game.

In one implementation, the apparatus further includes:
  (1) a first determining unit, configured to determine that the first virtual race car hits the second virtual race car when the client controls the first virtual race car of the first account to move on the virtual map of the round of racing game and the second virtual race car is contacted in a first hit detection region in which the first virtual race car is located, a size of the first hit detection region being greater than a size of the first virtual race car, the first virtual race car being located in the first hit detection region, the first hit detection region moving as the first virtual race car moves; or
  (2) a second determining unit, configured to determine that the first virtual race car hits the second virtual race car when the client controls the first virtual race car of the first account to move on the virtual map of the round of racing game and a second hit detection region in which the second virtual race car is located is contacted in a first hit detection region in which the first virtual race car is located, a size of the first hit detection region being greater than a size of the first virtual race car, the first virtual race car being located in the first hit detection region, the first hit detection region moving as the first virtual race car moves, a size of the second hit detection region being greater than a size of the second virtual race car, the second virtual race car being located in the second hit detection region, the second hit detection region moving as the second virtual race car moves.

In this embodiment, while the efficiency of ending the round of virtual game by the second virtual race car is improved, a detection region is configured for the first virtual race car and/or the second virtual race car, thereby improving the detection efficiency of detecting whether the first virtual race car hits the second virtual race car.

In one implementation, the apparatus further includes:
  (1) a third display unit, configured to display, on the client, that the endurance value of the second virtual race car is increased when the client controls the first virtual race car of the first account to move on the virtual map of the round of racing game and the second virtual race car remains within a preset region on the virtual map longer than a first preset duration.

In this embodiment, while the efficiency of ending the round of virtual game by the second virtual race car is improved, the preset region is provided on the virtual map, thereby ensuring that the second virtual race car can restore a partial or complete endurance value, to improve the flexibility that the second virtual race car chooses to end the current round of game.

In one implementation, the apparatus further includes:
(1) a fourth display unit, configured to display the preset region on the virtual map before the second virtual race car remains in the preset region on the virtual map longer than the first preset duration; and
(2) a fifth display unit, configured to cancel the display of the preset region on the virtual map when the second virtual race car remains in the preset region on the virtual map longer than the first preset duration.

In this embodiment, while the efficiency of ending the round of virtual game by the second virtual race car is improved, the preset region is displayed on the virtual map, and the display of the preset region is canceled after the preset region is used, thereby improving the flexibility of displaying the preset region, to further improve the flexibility of ending the current round of game by the second virtual race car.

In one implementation, the apparatus further includes:
(1) a second control unit, configured to cancel the display of the preset region on the virtual map when the round of racing game reaches a countdown start moment.

In this embodiment, while the efficiency of ending the round of virtual game by the second virtual race car is improved, the display of the preset region is canceled in a countdown stage, to prevent the second virtual race car from frequently restoring the endurance value, thereby improving the flexibility of ending the current round of game by the second virtual race car.

In one implementation, the apparatus further includes:
(1) a sixth display unit, configured to display, on the client, that the round of racing game has ended and the first virtual race car loses when the client controls the first virtual race car of the first account to move on the virtual map of the round of racing game and first preset duration after the round of racing game is started has ended and there is a fleeing race car with an endurance value being greater than the preset threshold; or
(2) a seventh display unit, configured to display, on the client, that the round of racing game has ended and the first virtual race car wins when first preset duration after the round of racing game is started has ended and there is no fleeing race car with an endurance value being greater than the preset threshold.

In this embodiment, while the efficiency of ending the round of virtual game by the second virtual race car is improved, winners and losers of the current round of game are determined by using the method, thereby improving the efficiency of ending the round of racing game.

In one implementation, the apparatus further includes:
an eighth display unit, configured to: display, on the client, a first limit region set on the virtual map during when the client controls the first virtual race car of the first account to move on the virtual map of the round of racing game; and
perform any one or combination of the following manners: reducing any one or combination of the speed, acceleration, acceleration time, and endurance value of the second virtual race car when the second virtual race car enters the first limit region; and increasing any one or combination of the speed, acceleration, and acceleration time of the first virtual race car when the first virtual race car enters the first limit region.

In this embodiment, while the efficiency of ending the round of virtual game by the second virtual race car is improved, the first limit region is used to change the statuses of the first virtual race car and/or the second virtual race car, thereby improving the versatility of the statuses of virtual race cars in the round of game.

In one implementation, the apparatus further includes:
(1) a third control unit, configured to cancel the display of the first limit region on the client after the display of the first limit region reaches second preset duration after the first limit region set on the virtual map is displayed on the client, the setting of the first limit region being canceled on the virtual map; and
(2) a ninth display unit, configured to: display, on the client, a second limit region set on the virtual map: and perform any one or combination of the following manners: reducing any one or combination of the speed, acceleration, acceleration time, and endurance value of the second virtual race car when the second virtual race car enters the second limit region; and increasing any one or combination of the speed, acceleration, and acceleration time of the first virtual race car when the first virtual race car enters the second limit region.

In this embodiment, while the efficiency of ending the round of virtual game by the second virtual race car is improved, the first limit region is removed and the second limit region is displayed, thereby improving the flexibility of configuring limit regions.

In one implementation, the apparatus further includes:
(1) a tenth display unit, configured to: display, on the client, a second limit region set on the virtual map after the first limit region set on the virtual map is displayed on the client; and perform any one or combination of the following manners: reducing any one or combination of the speed, acceleration, acceleration time, and endurance value of the second virtual race car when the second virtual race car enters the second limit region; and increasing any one or combination of the speed, acceleration, and acceleration time of the first virtual race car when the first virtual race car enters the second limit region.

In this embodiment, while the efficiency of ending the round of virtual game by the second virtual race car is improved, the first limit region is displayed and the second limit region is then displayed, thereby improving the flexibility of configuring limit regions.

In one implementation, the first limit region and the second limit region are set in any one or combination of the following manners: the first limit region and the second limit region are regions randomly set on the virtual map; the first limit region is smaller than the second limit region; and the first limit region is contained in the second limit region, and the first limit region overlaps the second limit region.

In this embodiment, while the efficiency of ending the round of virtual game by the second virtual race car is improved, the first limit region and the second limit region are flexibly combined, thereby improving the flexibility of configuring limit regions.

In one implementation, the apparatus further includes:
(1) an eleventh display unit, configured to display a mini-map of the virtual map on the client when the client controls the first virtual race car of the first account to move on the virtual map of the round of racing game, the mini-map being used for displaying the positions of the first virtual race car and the second virtual race car on the virtual map.

In this embodiment, while the efficiency of ending the round of virtual game by the second virtual race car is improved, the mini-map is displayed, thereby improving the display efficiency of displaying the first virtual race car and the second virtual race car.

In one implementation, the apparatus further includes:
(1) a fourth control unit, configured to display the mini-map on the client in a manner including any one or combination of the following: hiding the position of the second virtual race car on the mini-map displayed on the client when a distance between the second virtual race car and the first virtual race car is greater than a first threshold;
(2) a twelfth display unit, configured to display the position of the second virtual race car for third preset duration on the mini-map every fourth preset duration after the round of racing game is started; and
(3) a thirteenth display unit, configured to display the position of the second virtual race car on the mini-map displayed on the client when the round of racing game reaches the countdown start moment.

In this embodiment, while the efficiency of ending the round of virtual game by the second virtual race car is improved, it is determined according to different cases whether to display the position of the second virtual race car, thereby improving the flexibility of displaying the position of the second virtual race car.

In one implementation, the apparatus further includes:
(1) a fourteenth display unit, configured to display, on the client, that a first initial position of the first virtual race car on the virtual map remains unchanged within fourth preset duration after the round of racing game is started when the round of racing game is started, it being set that the first virtual race car is not allowed within the fourth preset duration to start moving from the first initial position, it being set that the second virtual race car is allowed to start moving from a second initial position on the virtual map when the round of racing game is started.

In this embodiment, while the efficiency of ending the round of virtual game by the second virtual race car is improved, the first virtual race car is controlled to remain at the same position within the fourth preset duration after the game is started, thereby ensuring the fairness of the game.

In one implementation, the virtual map includes any one or combination of the following race tracks: a race track having both an underground structure and a ground structure; and a circular race track with a height difference.

In this embodiment, while the efficiency of ending the round of virtual game by the second virtual race car is improved, a virtual race track is designed, so that virtual race tracks have varied styles, thereby improving the flexibility of choosing a path by the second virtual race car in a game process.

Figure 19:
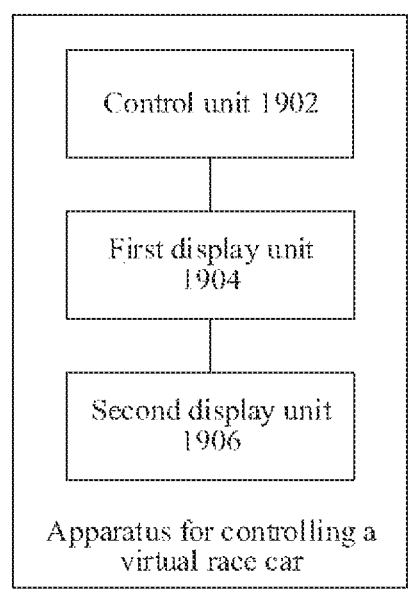
FIG. 19 is a schematic structural diagram of an optional apparatus for controlling a virtual race car according to an embodiment of this application.

According to an aspect of the embodiments of this application, an apparatus for controlling a virtual race car implementing the foregoing method for controlling a virtual race car is further provided. As shown in FIG. 19, the apparatus includes:
(1) a control unit 1902, configured to control, by a client on which a second account is logged in, a second virtual race car of the second account to move on a virtual map of a round of racing game in a process in which the client runs the round of racing game, the second virtual race car being a fleeing race car in the round of racing game;
(2) a first display unit 1904, configured to display, on the client, that an endurance value of the second virtual race car is reduced when the second virtual race car is hit by a first virtual race car on the virtual map, the first virtual race car being a pursuing race car in the round of racing game, the second account being an account participating in the round of racing game; and
(3) a second display unit 1906, configured to display, on the client, that the second virtual race car has been removed from the round of racing game when the endurance value of the second virtual race car is no greater than a preset threshold.

In one implementation, the apparatus for controlling a virtual race car may be applied to, but not limited to, the field of games, for example, racing games, or applied to the field of virtual training. For example, the method is applied to a racing game. A user may log in to the second account on the client to run the round of racing game, and the second account uses the client to control the second virtual race car to move. The round of game further includes the first virtual race car. In the round of racing game, the first virtual race car is a pursuing race car, the second virtual race car is a fleeing race car, and the pursuing race car chases and hits the fleeing race car. The fleeing race car has an endurance value. The endurance value of the fleeing car is reduced after being hit by the pursuing race car. The fleeing race car with the endurance value being the preset threshold ends the round of racing game. After the second virtual race car is hit by the pursuing race car and the endurance value of the second virtual race car is the preset threshold, the second virtual race car is eliminated from the round of racing game. The preset threshold may be a preset endurance threshold for the fleeing race car, that is, the second virtual race car to end the racing game. During specific implementation, the preset threshold may be flexibly set.

In this case, a message indicating that the second virtual race car is eliminated may be displayed on the client on which the second account is logged in. A viewpoint of the client on which the second account is logged in may be switched to a viewpoint of another fleeing player that has not been eliminated.

In this embodiment, an endurance value of the second virtual race car is reduced when the first virtual race car hits the second virtual race car; and the second virtual race car ends the round of racing game when the endurance value of the second virtual race car is reduced to the preset threshold. The second virtual race car or the first virtual race car does not need to reach a preset finish line before the round of racing game can be ended, thereby improving the efficiency of ending a current round of virtual game by the second virtual race car.

In one implementation, the first virtual race car is a virtual race car of a first account in the process of the round of racing game, and the first account is an account participating in the round of racing game.

In one implementation, the apparatus further includes:
(1) a third display unit, configured to display, on the client, that the endurance value of the second virtual race car is increased when the client controls the second virtual race car of the second account to move on the virtual map of the round of racing game and the second virtual race car remains within a preset region on the virtual map longer than a first preset duration.

In this embodiment, on the basis of improving the efficiency of ending a current round of virtual game by the second virtual race car, the preset region is added to restore the endurance value of the second virtual race car, thereby ensuring that the second virtual race car can restore a partial or complete endurance value, to improve the flexibility that the second virtual race car chooses to end the current round of game.

In one implementation, the apparatus further includes:

(1) a fourth display unit, configured to: display, on the client, a first limit region set on the virtual map when the client controls the second virtual race car of the second account to move on the virtual map of the round of racing game; and perform any one or combination of the following manners: reducing any one or combination of the speed, acceleration, acceleration time, and endurance value of the second virtual race car when the second virtual race car enters the first limit region; and increasing any one or combination of the speed, acceleration, and acceleration time of the first virtual race car when the first virtual race car enters the first limit region.

In this embodiment, while the efficiency of ending the round of virtual game by the second virtual race car is improved, the first limit region is used to change the statuses of the first virtual race car and/or the second virtual race car, thereby improving the versatility of the statuses of virtual race cars in the round of game.

In this application, the term "unit" or "module" refers to a computer program or part of the computer program that has a predefined function and works together with other related parts to achieve a predefined goal and may be all or partially implemented by using software, hardware (e.g., processing circuitry and/or memory configured to perform the predefined functions), or a combination thereof. Each unit or module can be implemented using one or more processors (or processors and memory). Likewise, a processor (or processors and memory) can be used to implement one or more modules or units. Moreover, each module or unit can be part of an overall module that includes the functionalities of the module or unit. For other implementations of this embodiment, reference may be made to the description of the foregoing embodiments, and details are not described herein.

Figure 20:
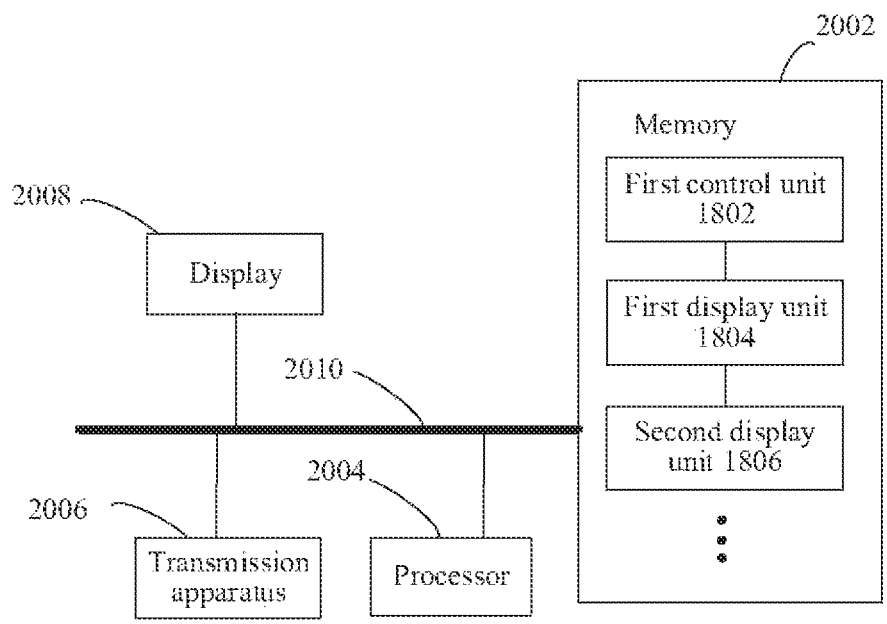
FIG. 20 is a schematic structural diagram of an optional device according to an embodiment of this application.

According to another aspect of the embodiments of this application, a device configured to implement the method for controlling a virtual race car is further provided. As shown in FIG. 20, the device includes a memory 2002 and a processor 2004. The memory 2002 stores a computer program. The processor 2004 is configured to perform steps in any one of the foregoing method embodiments through the computer program.

In one implementation, the device may be located in at least one of a plurality of network devices in a computer network.

In one implementation, the processor may be configured to perform the following steps through a computer program:

S1. A client on which a first account is logged in controls a first virtual race car of the first account to move on a virtual map of a round of racing game in a process in which the client runs the round of racing game, the first virtual race car being a pursuing race car in the round of racing game.

S2. Display, on the client, that an endurance value of a second virtual race car is reduced when the first virtual race car hits the second virtual race car on the virtual map, the second virtual race car being a fleeing race car in the round of racing game, the first account being an account participating in the round of racing game.

S3. Display, on the client, that the second virtual race car has been removed from the round of racing game when the endurance value of the second virtual race car is no greater than a preset threshold.

In one implementation, a person of ordinary skill in the art may understand that, the structure shown in FIG. 20 is only illustrative. The device may be a smartphone such as an Android mobile phone, or an iPhone Operating System (iOS) mobile phone, a tablet computer (a portable android device (PAD)), a palmtop computer, a mobile Internet device (MID), or a terminal device. FIG. 20 does not limit the structure of the device. For example, the device may further include more or fewer components (such as a network interface) than those shown in FIG. 20, or have a configuration different from that shown in FIG. 20.

The memory 2002 may be configured to store software programs and modules, for example, program instructions/modules corresponding to the method and apparatus for controlling a virtual race car in the embodiments of this application. The processor 2004 runs the software programs and modules stored in the memory 2002, to perform various functional applications and data processing, to be specific, implement the foregoing method for controlling a virtual race car. The memory 2002 may include a high-speed random access memory, and may also include a non-volatile memory, for example, one or more magnetic storage apparatuses, a flash memory, or another non-volatile solid-state memory. In some embodiments, the memory 2002 may further include memories remotely disposed relative to the processor 2004, and the remote memories may be connected to a terminal through a network. Examples of the network include, but are not limited to, the Internet, an intranet, a local area network, a mobile communication network, and a combination thereof. The memory 2002 may be specifically (but not limited to) configured to store information such as position information of the first virtual race car, position information of the second virtual race car, and the endurance value of the second virtual race car. In an example, as shown in FIG. 20, the memory 2002 may include, but is not limited to, the first control unit 1802, the first display unit 1804, and the second display unit 1806 in the apparatus for controlling a virtual race car. In addition, the memory may further include, but is not limited to, other module units in the apparatus for controlling a virtual race car. The other module units are not described in detail in this example.

In one implementation, a transmission apparatus 2006 is configured to receive or transmit data through a network. Specific examples of the network may include a wired network and a wireless network. In an example, the transmission apparatus 2006 includes a network interface controller (NIC). The NIC may be connected to another network device and a router by using a network cable, to communicate with the Internet or a local area network. In an example, the transmission apparatus 2006 is a radio frequency (RF) module, which communicates with the Internet in a wireless manner.

In addition, the device further includes: a display 2008, configured to display a virtual scene of the round of racing game; and a connection bus 2010, configured to connect various module components in the device.

Figure 21:
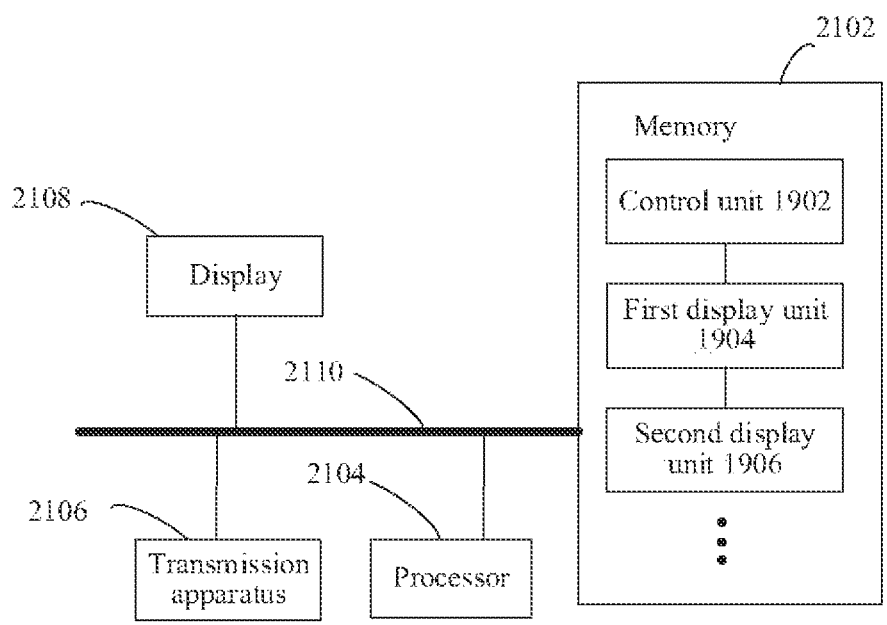
FIG. 21 is a schematic structural diagram of an optional device according to an embodiment of this application.

According to another aspect of the embodiments of this application, a device configured to implement the method for controlling a virtual race car is further provided. As shown in FIG. 21, the device includes a memory 2102 and a processor 2104. The memory 2102 stores a computer program. The processor 2104 is configured to perform steps in any one of the foregoing method embodiments through the computer program.

In one implementation, the device may be located in at least one of a plurality of network devices in a computer network.

In one implementation, the processor may be configured to perform the following steps through a computer program:
- S1. A client on which a second account is logged in controls a second virtual race car of the second account to move on a virtual map of a round of racing game in a process in which the client runs the round of racing game, the second virtual race car being a fleeing race car in the round of racing game.
- S2. Display, on the client, that an endurance value of the second virtual race car is reduced when the second virtual race car is hit by a first virtual race car on the virtual map, the first virtual race car being a pursuing race car in the round of racing game, a first account being an account participating in the round of racing game.
- S3. Display, on the client, that the second virtual race car has been removed from the round of racing game when the endurance value of the second virtual race car is no greater than a preset threshold.

In one implementation, a person of ordinary skill in the art may understand that, the structure shown in FIG. 21 is only illustrative. The device may be a terminal device such as a smartphone (such as an Android mobile phone or an iOS mobile phone), a tablet computer, a palmtop computer, a MID, or a PAD. FIG. 21 does not limit the structure of the device. For example, the device may further include more or fewer components (such as a network interface) than those shown in FIG. 21, or have a configuration different from that shown in FIG. 21.

The memory 2102 may be configured to store software programs and modules, for example, program instructions/modules corresponding to the method and apparatus for controlling a virtual race car in the embodiments of this application. The processor 2104 runs the software programs and modules stored in the memory 2102, to perform various functional applications and data processing, to be specific, implement the foregoing method for controlling a virtual race car. The memory 2102 may include a high-speed random access memory, and may also include a non-volatile memory, for example, one or more magnetic storage apparatuses, a flash memory, or another non-volatile solid-state memory. In some embodiments, the memory 2102 may further include memories remotely disposed relative to the processor 2104, and the remote memories may be connected to a terminal through a network. Examples of the network include, but are not limited to, the Internet, an intranet, a local area network, a mobile communication network, and a combination thereof. The memory 2102 may be specifically (but not limited to) configured to store information such as position information of the first virtual race car, position information of the second virtual race car, and the endurance value of the second virtual race car. In an example, as shown in FIG. 21, the memory 2102 may include, but is not limited to, a control unit 1902, a first display unit 1904, and a second display unit 1906 in the apparatus for controlling a virtual race car. In addition, the memory may further include, but is not limited to, other module units in the apparatus for controlling a virtual race car. The other module units are not described in detail in this example.

In one implementation, a transmission apparatus 2106 is configured to receive or transmit data through a network. Specific examples of the network may include a wired network and a wireless network. In an example, the transmission apparatus 2106 includes a network interface controller (NIC). The NIC may be connected to another network device and a router by using a network cable, to communicate with the Internet or a local area network. In an example, the transmission apparatus 2106 is a radio frequency (RF) module, which communicates with the Internet in a wireless manner.

In addition, the device further includes: a display 2108, configured to display a virtual scene of the round of racing game; and a connection bus 2110, configured to connect various module components in the device.

According to still another aspect of the embodiments of this application, a storage medium is further provided. The storage medium stores a computer program, the computer program being set to perform steps in any one of the foregoing method embodiments when run.

In one implementation, a person of ordinary skill in the art may understand that all or some of the steps of the methods in the foregoing embodiments may be implemented by a program instructing relevant hardware of a terminal device. The program may be stored in a computer-readable storage medium, and the storage medium may include a flash disk, a read-only memory (ROM), a random access memory (RAM), a magnetic disk, an optical disc, or the like.

An embodiment of this application further provides a computer program product including instructions, the computer program product, when run on a computer, causing the computer to perform the method in any foregoing method embodiment.

The sequence numbers of the foregoing embodiments of this application are merely for description purposes, and are not intended to indicate the preference among the embodiments.

When the integrated unit in the foregoing embodiments is implemented in a form of a software functional unit and sold or used as an independent product, the integrated unit may be stored in the foregoing computer-readable storage medium. Based on such an understanding, the technical solutions of this application essentially, or the part contributing to the related art, or all or some of the technical solutions may be implemented in a form of a software product. The computer software product is stored in a storage medium and includes several instructions for instructing one or more computer devices (which may be a PC, a server, a network device, and the like) to perform all or some of the steps of the methods described in the embodiments of this application.

In the foregoing embodiments of this application, descriptions of the embodiments have respective focuses. As for parts that are not described in detail in one embodiment, reference may be made to the relevant descriptions of the other embodiments.

In the several embodiments provided in this application, it is to be understood that, the disclosed client may be implemented in another manner. The apparatus embodiments described above are merely exemplary. For example, the unit division is merely logical function division and may be other division in actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the units or modules may be implemented in electrical or other forms.

The units described as separate components may or may not be physically separated, and the components displayed as units may or may not be physical units, and may be located in one place or may be distributed on a plurality of network units. Some or all of the units may be selected according to actual requirements to achieve the objectives of the solutions of the embodiments.

In addition, functional units in the embodiments of this application may be integrated into one processing unit, or each of the units may exist alone physically, or two or more units may be integrated into one unit. The integrated unit may be implemented in a form of hardware, or may be implemented in a form of a software functional unit.

The foregoing descriptions are merely exemplary implementations of this application. A person of ordinary skill in the art may further make several improvements and modifications without departing from the principle of this application, and the improvements and modifications are also considered as falling within the protection scope of this application.

What is claimed is:

1. A method for controlling a virtual race car performed by a computer device, the method comprising:
controlling, using a client on which a first account is logged in, a first virtual race car of the first account to move on a virtual map of a round of racing game, the first virtual race car being a pursuing race car in the round of racing game and the first account being an account participating in the round of racing game;
displaying, on the client, that an endurance value of a second virtual race car is reduced when the first virtual race car hits the second virtual race car on the virtual map, the second virtual race car being a fleeing race car in the round of racing game controlled by a second account logged into the round of racing game; and
displaying, on the client, that the second virtual race car wins the round of racing game when the endurance value of the second virtual race car is greater than a preset threshold for a specified time.

2. The method according to claim 1, wherein the method further comprises:
displaying, on the client, that the second virtual race car has been removed from the round of racing game when the endurance value of the second virtual race car is no greater than the preset threshold.

3. The method according to claim 1, wherein the method further comprises:
receiving, on the client, an instruction that the endurance value of the second virtual race car is increased when the second virtual race car remains within a preset region on the virtual map longer than a first preset duration.

4. The method according to claim 3, wherein the method further comprises:
when the second virtual race car remains in the preset region on the virtual map longer than the first preset duration, canceling the display of the preset region on the virtual map.

5. The method according to claim 3, wherein the method further comprises:
canceling the display of the preset region on the virtual map when the round of racing game reaches a countdown start moment.

6. The method according to claim 1, wherein the method further comprises:
displaying, on the client, that the round of racing game has terminated and the first virtual race car loses when there is at least one fleeing race car with an endurance value greater than the preset threshold after a first preset duration since the round of racing game is started.

7. The method according to claim 1, wherein the method further comprises:
displaying, on the client, that the round of racing game has terminated and the first virtual race car wins when there is no fleeing race car with an endurance value greater than the preset threshold after a first preset duration since the round of racing game is started.

8. The method according to claim 1, wherein the method further comprises:
displaying, on the client, a first limit region on the virtual map; and
performing any one or combination of the following manners:
reducing any one or combination of speed, acceleration, acceleration time, and endurance value of the second virtual race car when the second virtual race car enters the first limit region; and
increasing any one or combination of the speed, acceleration, and acceleration time of the first virtual race car when the first virtual race car enters the first limit region.

9. The method according to claim 8, wherein the method further comprises:
after displaying, on the client, the first limit region set on the virtual map, canceling the display of the first limit region on the client after the display of the first limit region reaches a second preset duration, the setting of the first limit region being canceled on the virtual map;
displaying, on the client, a second limit region set on the virtual map; and
performing any one or combination of the following manners:
reducing any one or combination of the speed, acceleration, acceleration time, and endurance value of the second virtual race car when the second virtual race car enters the second limit region; and
increasing any one or combination of the speed, acceleration, and acceleration time of the first virtual race car when the first virtual race car enters the second limit region.

10. The method according to claim 8, wherein the method further comprises:
after displaying, on the client, the first limit region set on the virtual map, displaying, on the client, a second limit region set on the virtual map; and
performing any one or combination of the following manners:
reducing any one or combination of the speed, acceleration, acceleration time, and endurance value of the second virtual race car when the second virtual race car enters the second limit region; and
increasing any one or combination of the speed, acceleration, and acceleration time of the first virtual race car when the first virtual race car enters the second limit region.

11. The method according to claim 10, wherein the first limit region and the second limit region are set in any one or combination of the following manners:
the first limit region and the second limit region are regions randomly set on the virtual map;
the first limit region is smaller than the second limit region; and
the first limit region is contained in the second limit region, and the first limit region overlaps the second limit region.

12. The method according to claim 1, wherein the method further comprises:

displaying a mini-map of the virtual map on the client, the mini-map including the positions of the first virtual race car and the second virtual race car on the virtual map.

13. The method according to claim 12, wherein the displaying the mini-map on the client comprises:

hiding the position of the second virtual race car on the mini-map displayed on the client when a distance between the second virtual race car and the first virtual race car is greater than a first threshold.

14. The method according to claim 12, wherein the displaying the mini-map on the client comprises:

displaying the position of the second virtual race car for a third preset duration on the mini-map every fourth preset duration after the round of racing game is started.

15. The method according to claim 12, wherein the displaying the mini-map on the client comprises:

displaying the position of the second virtual race car on the mini-map displayed on the client when the round of racing game reaches the countdown start moment.

16. The method according to claim 1, wherein the virtual map comprises any one or combination of the following race tracks:

a race track having both an underground structure and a ground structure; and a circular race track with a height difference.

17. The method according to claim 1, wherein the endurance value of a second virtual race car is reduced at a predefined amount when a corresponding location of the first virtual race car hits the second virtual race car on the virtual map.

18. A computer device, comprising a memory and a processor, the memory storing a plurality of computer programs that, when executed by the processor, cause the computer device to perform a method for controlling a virtual race car including:

controlling, using a client on which a first account is logged in, a first virtual race car of the first account to move on a virtual map of a round of racing game, the first virtual race car being a pursuing race car in the round of racing game and the first account being an account participating in the round of racing game;

displaying, on the client, that an endurance value of a second virtual race car is reduced when a predefined location of the first virtual race car hits the second virtual race car on the virtual map, the second virtual race car being a fleeing race car in the round of racing game controlled by a second account logged into the round of racing game; and displaying, on the client, that the second virtual race car wins the round of racing game when the endurance value of the second virtual race car is greater than a preset threshold for a specified time.

19. The computer device according to claim 18, wherein the method further comprises:

receiving, on the client, an instruction that the endurance value of the second virtual race car is increased when the second virtual race car remains within a preset region on the virtual map longer than a first preset duration.

20. A non-transitory computer-readable storage medium, the storage medium storing a plurality of computer programs that, when executed by a processor of a computer device, cause the computer device to perform a method for controlling a virtual race car including:

controlling, using a client on which a first account is logged in, a first virtual race car of the first account to move on a virtual map of a round of racing game, the first virtual race car being a pursuing race car in the round of racing game and the first account being an account participating in the round of racing game;

displaying, on the client, that an endurance value of a second virtual race car is reduced when the first virtual race car hits the second virtual race car on the virtual map, the second virtual race car being a fleeing race car in the round of racing game controlled by a second account logged into the round of racing game; and displaying, on the client, that the second virtual race car wins the round of racing game when the endurance value of the second virtual race car is greater than a preset threshold for a specified time.

* * * * *